(12) United States Patent
Ohmae et al.

(10) Patent No.: US 9,900,969 B2
(45) Date of Patent: Feb. 20, 2018

(54) ANTISTATIC COVER

(71) Applicant: Nippon Pillar Packing Co., Ltd., Osaka-shi, Osaka (JP)

(72) Inventors: Kiyotaka Ohmae, Osaka (JP); Kazukiyo Teshima, Osaka (JP); Satoru Matsuda, Osaka (JP); Masaki Miyamoto, Osaka (JP); Daisuke Urata, Osaka (JP)

(73) Assignee: NIPPON PILLAR-PACKING CO., LTD., Osaka-Shi (JP)

( * ) Notice: Subject to any disclaimer, the term of this patent is extended or adjusted under 35 U.S.C. 154(b) by 369 days.

(21) Appl. No.: 14/718,679

(22) Filed: May 21, 2015

(65) Prior Publication Data

US 2015/0342012 A1 Nov. 26, 2015

(30) Foreign Application Priority Data

May 23, 2014 (JP) ................... 2014-106732
Sep. 30, 2014 (JP) ................... 2014-199734
Nov. 4, 2014 (JP) ................... 2014-224647
Nov. 4, 2014 (JP) ................... 2014-224648

(51) Int. Cl.
  *H05F 1/00* (2006.01)
  *F16L 57/00* (2006.01)

(52) U.S. Cl.
  CPC ............ *H05F 1/00* (2013.01); *F16L 57/00* (2013.01); *F16L 2201/60* (2013.01)

(58) Field of Classification Search
  CPC .......... H05F 1/00; F16L 57/00; F16L 2201/60
  See application file for complete search history.

(56) References Cited

U.S. PATENT DOCUMENTS

| 2003/0178086 A1 | 9/2003 | Hu | |
| 2009/0243824 A1* | 10/2009 | Peterson | B60R 1/12 340/435 |
| 2010/0165035 A1* | 7/2010 | Komatsu | B41J 29/393 347/19 |

FOREIGN PATENT DOCUMENTS

| CH | 546374 | 2/1974 |
| GB | 1219768 | 1/1971 |
| JP | 2003-004176 | 1/2003 |

OTHER PUBLICATIONS

European Search Report dated Oct. 14, 2015, 10 pages.

* cited by examiner

*Primary Examiner* — Zeev V Kitov
(74) *Attorney, Agent, or Firm* — Rankin, Hill & Clark LLP

(57) ABSTRACT

An antistatic cover which, when the cover covers an insulating resin-made tube, can enhance the certainty of preventing the tube from being electrically charged, and can facilitate attachment to and detachment from the tube. The tubular cover body, is divided in a circumferential direction to form first and second divided portions. The cover body is elastically deformed such that the first and second divided portions separate from each other, and allow the tube to pass through between the first and second divided portions. The cover body has a plurality of first cutaway portions, which pass through at least one of the first and second divided portions in a radial direction of the cover body, and is configured such that, when the cover body is fitted onto the tube, a part of the tube can be exposed through the plurality of first cutaway portions.

10 Claims, 40 Drawing Sheets

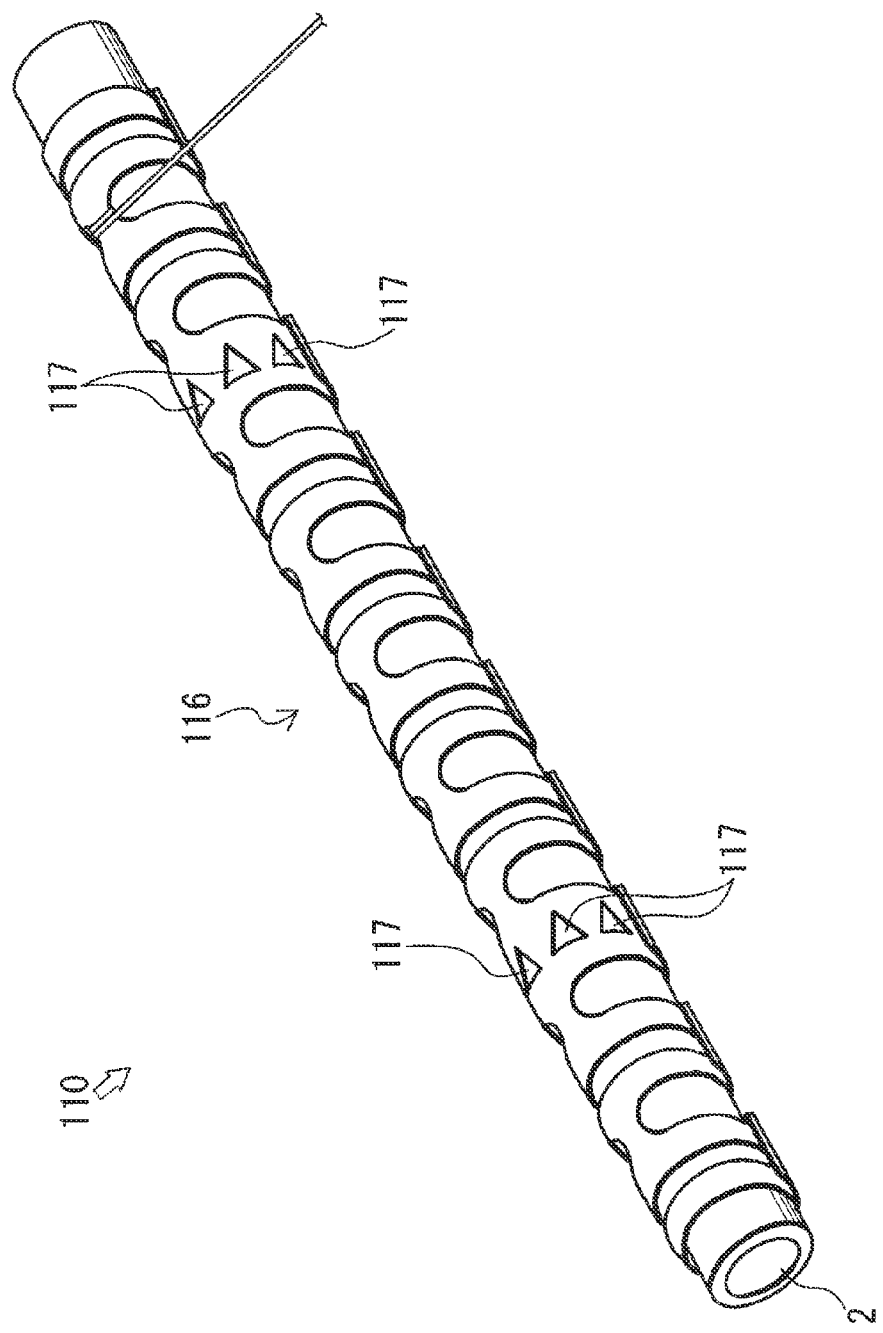

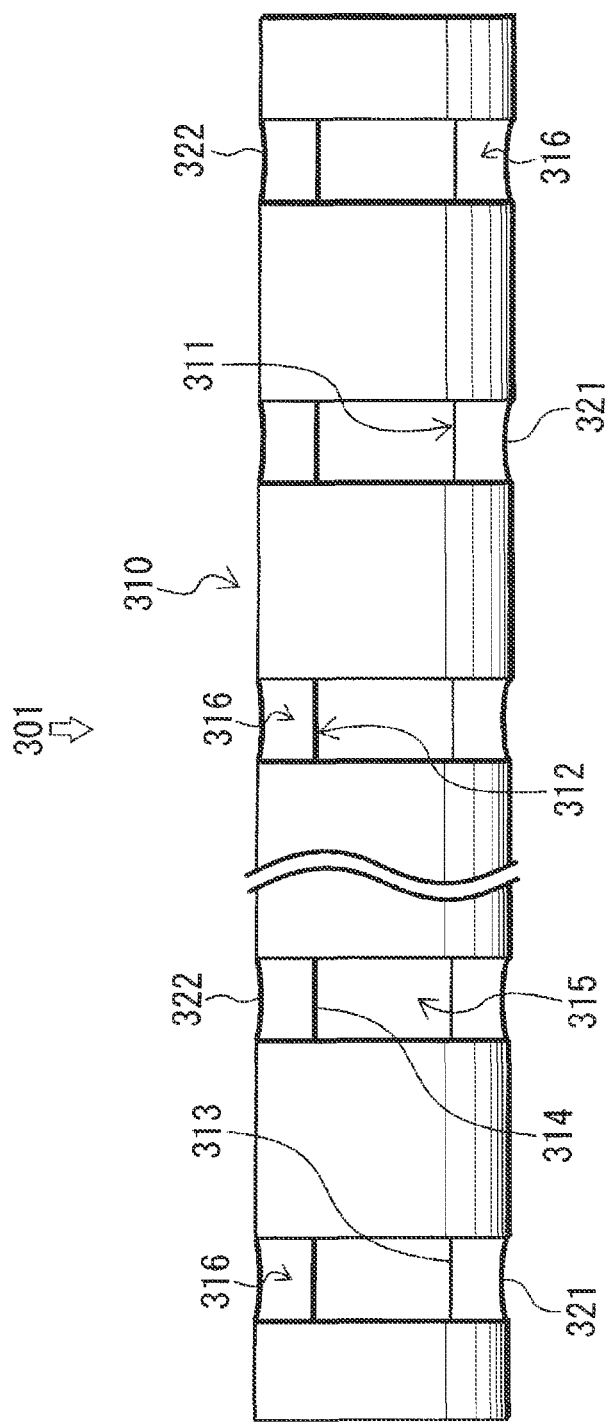

ANTISTATIC COVER

TECHNICAL FIELD

The present invention relates to an antistatic cover which prevents an insulating resin-made tube from being electrically charged.

BACKGROUND ART

In the case where a combustible fluid (electrically insulating fluid) such as an organic solvent flows through an insulating resin-made tube, conventionally, the tube is easily electrically charged by friction with the combustible fluid. Also in the case where, in a factory or the like in which an insulating resin-made tube is used, the insulating resin-made tube is rubbed with a clean room glove, the tube is easily electrically charged.

As means for preventing an insulating resin-made tube from being electrically charged, therefore, countermeasures have been taken in which an electrically conductive material (hereinafter, referred to simply as "conductive material") such as graphite or fine metal powder is disposed in the insulating resin-made tube in order to make the tube electrically conductive. In a fluororesin-made tube (insulating resin-made tube) disclosed in Patent Literature 1, for example, conductive portions containing a conductive material are disposed in the outer circumferential surface of the tube body which is configured by a transparent portion in order to ensure the visibility.

In the fluororesin-made tube disclosed in Patent Literature 1, however, the conductive portions are elongated in a stripe manner along the longitudinal direction of the tube body. Depending on the installation situation, therefore, the conductive portions cannot be positioned in a required place of the tube in the case where a combustible fluid flows at a low rate, and there is a possibility that the function of preventing the tube from being electrically charged cannot be sufficiently exerted.

Moreover, the technique disclosed in Patent Literature 1 uses the configuration where the tube contains a conductive material, i.e., that where the tube itself is caused to have electrically conductive property. Therefore, the technique cannot be applied to an existing tube made of only fluororesin (insulating resin), and consequently the existing tube cannot be provided with the electrical charge preventing function.

PRIOR ART LITERATURE

Patent Literature

[Patent Literature 1] Japanese Patent Application Laid-Open No. 2003-4176

SUMMARY OF THE INVENTION

Problems to be Solved by the Invention

The invention has been conducted in view of the above-discussed circumstances. It is an object of the invention to provide an antistatic cover which, when the cover covers an insulating resin-made tube, can enhance the certainty of preventing the tube from being electrically charged, and which can facilitate attachment to and detachment from the tube.

Means for Solving the Problems

According to a first mode of the invention, an antistatic cover is provided which is to cover a transparent or translucent insulating resin-made tube, wherein the cover includes a tubular cover body which is made of a resin composition containing a conductive material, and which can be fitted onto the tube, the cover body is divided in one place in a circumferential direction to form first and second divided portions (hereinafter, "first divided portion" is referred to as "1-st divided portion", and "second divided portion" is referred to as "2-nd divided portion"), and elastically deformable in a manner that the 1-st and 2-nd divided portions approach or separate from each other, the cover body is configured so as to be elastically deformed in a manner that the 1-st and 2-nd divided portions separate from each other, and allow the tube to pass through between the 1-st and 2-nd divided portions, and the cover body has a plurality of first cutaway portions (hereinafter, "first cutaway portion" is referred to as "1-st cutaway portion") portion which pass through at least one of the 1-st and 2-nd divided portions in a radial direction of the cover body, and is configured in a manner that, when the cover body is fitted onto the tube, a part of the tube can be exposed through the plurality of 1-st cutaway portions.

According to a second mode of the invention, in the first mode, the cover body has a plurality of through holes which pass through the cover body in a radial direction of the cover body, and is configured in a manner that, when the cover body is fitted onto the tube, a part of the tube can be exposed through the plurality of through holes.

According to a third mode of the invention, in the first mode, the cover body is formed into a tubular shape in a state where the 1-st and 2-nd divided portions overlap each other.

According to a fourth mode of the invention, in the first mode, in at least one of the plurality of 1-st cutaway portions, a rounding process is applied to a closed portion.

According to a fifth mode of the invention, in the first mode, in each of the plurality of 1-st cutaway portions, a chamfering process is applied to an opening edge.

According to a sixth mode of the invention, in the first mode, an indication relating to a fluid flowing through the tube is disposed at a position in the cover body, the position being visible from an outside.

According to a seventh mode of the invention, an antistatic cover is provided which is to cover an insulating resin-made tube, wherein the cover includes a tubular cover body which is made of a resin composition containing a conductive material, and which can surround a whole circumference of the tube, the cover body is divided in one place in a circumferential direction to form 1-st and 2-nd divided portions, and configured to be elastically deformable in a manner that a gap through which the tube is passable can be formed between the 1-st and 2-nd divided portions, the cover body has a second cutaway portion (hereinafter, "second cutaway portion" is referred to as "2-nd cutaway portion") which is disposed along the circumferential direction of the cover body, and the 2-nd cutaway portion has a length which is 40% or more of a length of one circumference of the cover body, in the circumferential direction of the cover body.

According to an eighth mode of the invention, in the seventh mode, a plurality of 2-nd cutaway portions are disposed in an axial direction of the cover body.

According to a ninth mode of the invention, in the eighth mode, the cover body has a third cutaway portion (hereinafter, "third cutaway portion" is referred to as "3-rd cutaway portion") which is different from the 2-nd cutaway portions, in at least one of the 1-st and 2-nd divided portions and between adjacent ones of the plurality of 2-nd cutaway portions.

According to a tenth mode of the invention, in the seventh mode, in the 2-nd cutaway portion, closed portions on sides of both ends in the circumferential direction are rounded.

According to an eleventh mode of the invention, in the seventh mode, the cover body is formed into a tubular shape in a state where the 1-st and 2-nd divided portions overlap each other.

According to a twelfth mode of the invention, an antistatic cover is provided which is to cover an insulating resin-made tube, wherein the cover includes a tubular cover body which is made of a resin composition containing a conductive material, and in which a part in a circumferential direction is cut away in a manner that one and other circumferential end portions that form a gap having a predetermined size between the end portions are formed, the cover body has a forth cutaway portion (hereinafter, "fourth cutaway portion" is referred to as "4-th cutaway portion") which is disposed along the circumferential direction of the cover body, and configured to be elastically deformable in a manner that the cover body is fittable onto the tube while the tube passes through the gap, and the 4-th cutaway portion has a length which is 40% or more of a length of one circumference of the cover body, in the circumferential direction of the cover body.

According to a thirteenth mode of the invention, in the twelfth mode, a plurality of 4-th cutaway portions are disposed in an axial direction of the cover body.

According to a fourteenth mode of the invention, in the thirteenth mode, the cover body has a fifth cutaway portion (hereinafter, "fifth cutaway portion" is referred to as "5-th cutaway portion") which is different from the 4-th cutaway portions, in at least one of the one and other circumferential end portions and between adjacent ones of the plurality of 4-th cutaway portions.

According to a fifteenth mode of the invention, in the twelfth mode, in the 4-th cutaway portion, closed portions on sides of both ends in the circumferential direction are rounded.

Effects of the Invention

According to the invention, it is possible to provide an antistatic cover which, when the cover covers an insulating resin-made tube, can enhance the certainty of preventing the tube from being electrically charged, and which can facilitate attachment to and detachment from the tube.

BRIEF DESCRIPTION OF THE DRAWINGS

FIG. 7A is a view of a state immediately before attachment to the tube, FIG. 7B is a view of a state after attachment to the tube, and FIG. 7C is a view of a state after the cover is attached to a tube which is thicker than the tube shown in FIG. 7B.

FIG. 8 is a view showing a use state of an antistatic cover of another embodiment of the invention.

FIG. 29 is a plan view of the antistatic cover of FIG. 25.

DESCRIPTION OF PREFERRED EMBODIMENTS

Firstly, a first embodiment of the invention will be described with reference to the drawings.

Figure 1:
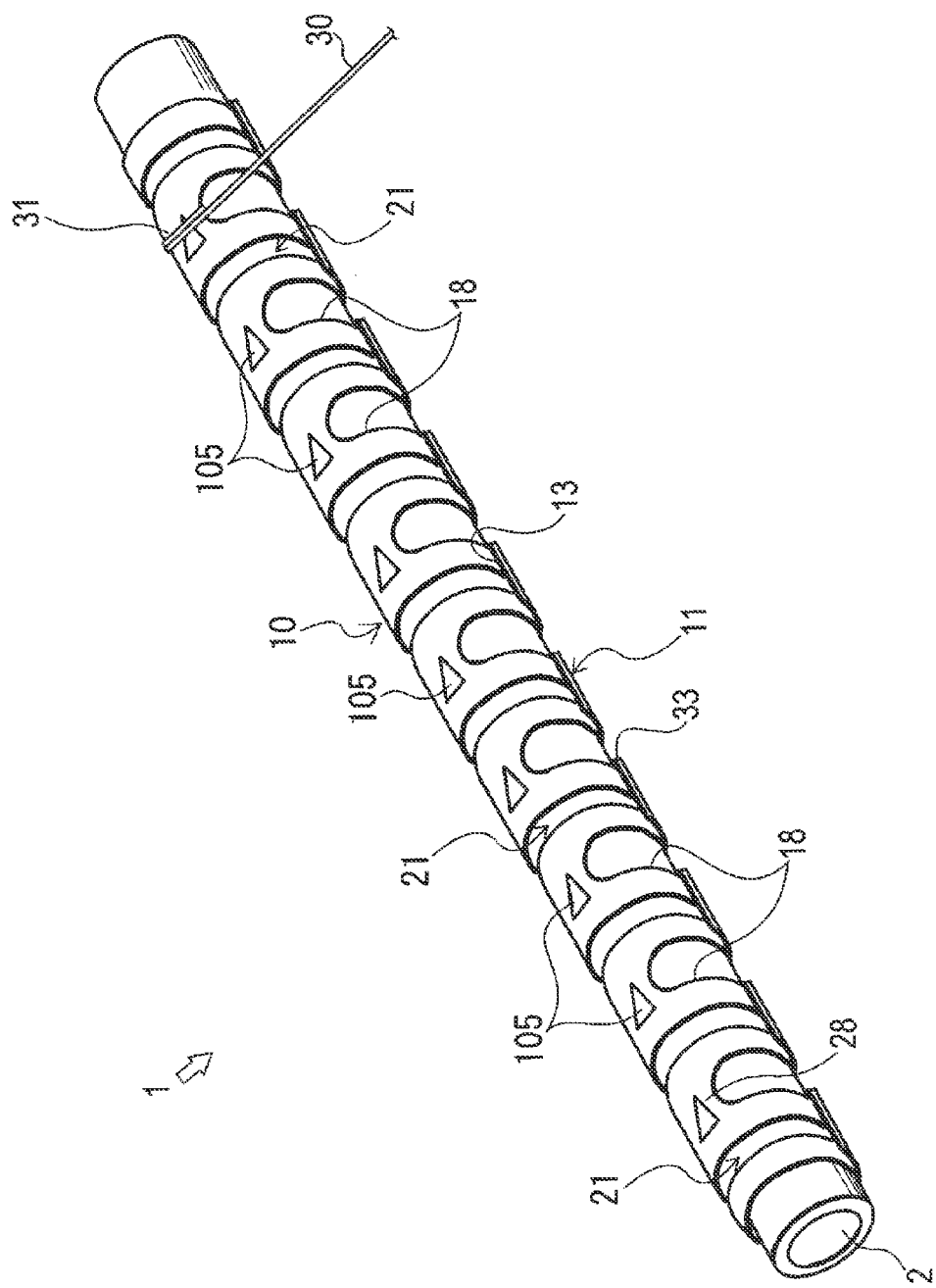
FIG. 1 is a view showing a use state of an antistatic cover of a first embodiment of the invention.

FIG. 1 shows a use state of an antistatic cover 1 of the first embodiment of the invention.

As shown in FIG. 1, the antistatic cover 1 of the embodiment is used on a tube 2 through which a combustible fluid (electrically insulating fluid) such as an organic solvent flows, in order to prevent the tube from being electrically charged. The antistatic cover 1 can cover the outer circumference of the tube 2, and is formed so as to have a tubular shape in conformity with the tube 2 which has a tubular shape.

The tube 2 is an insulating resin-made tube which is formed to be substantially transparent or translucent in order to ensure the visibility of the interior. An example of the insulating resin-made tube is a fluororesin-made tube. In the embodiment, the tube 2 is produced by using a fluororesin such as PFA (perfluoro alkoxyalkane), and formed to be transparent or translucent to allow the interior to be visible.

Figure 2:
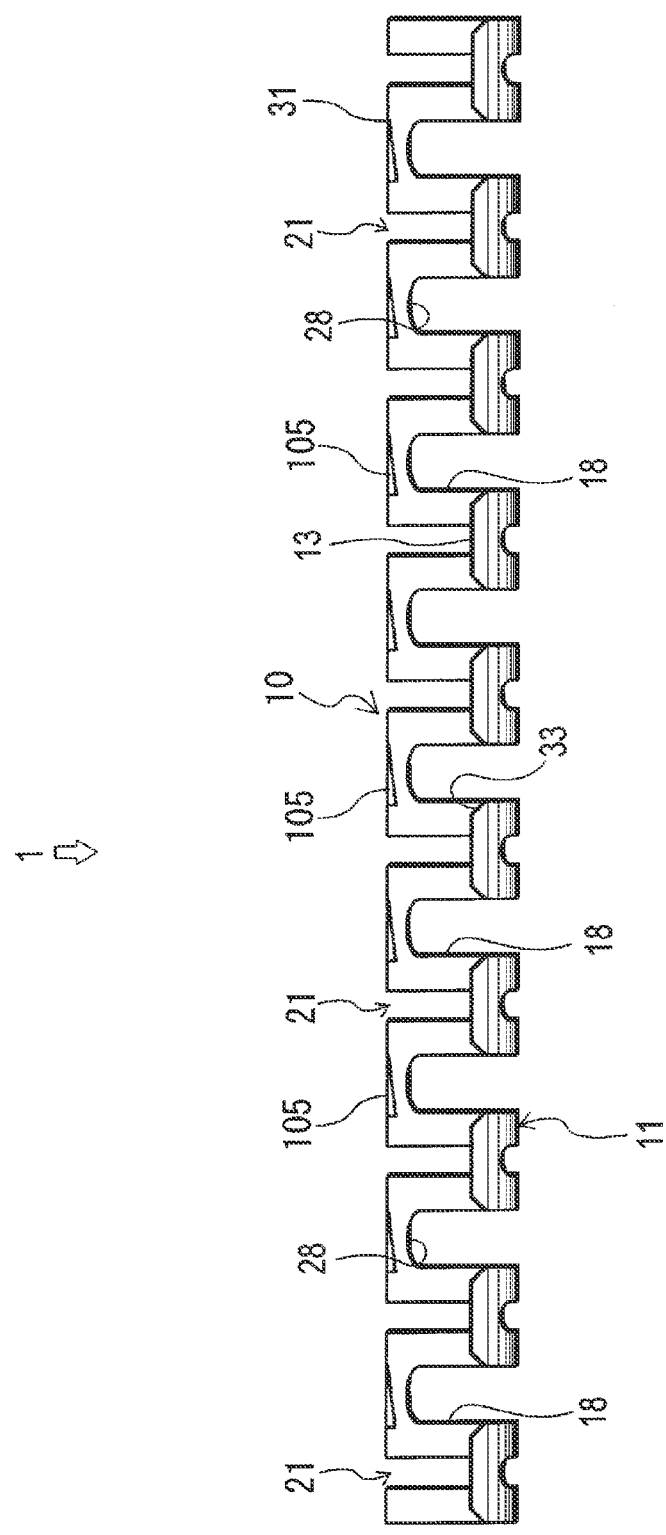
FIG. 2 is a front view of the antistatic cover of FIG. 1.
Figure 3:
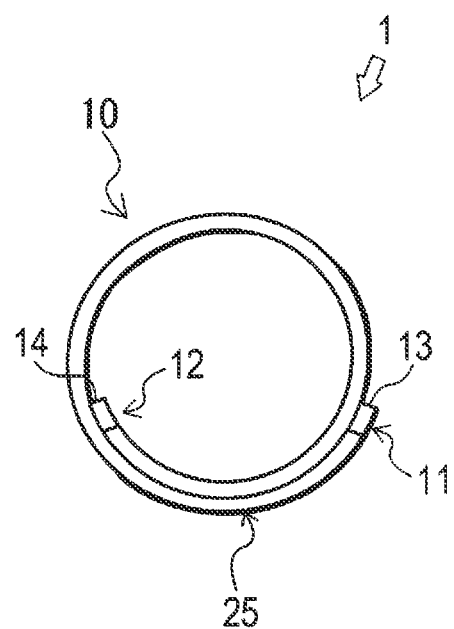
FIG. 3 is a side view of the antistatic cover of FIG. 1.
Figure 4:
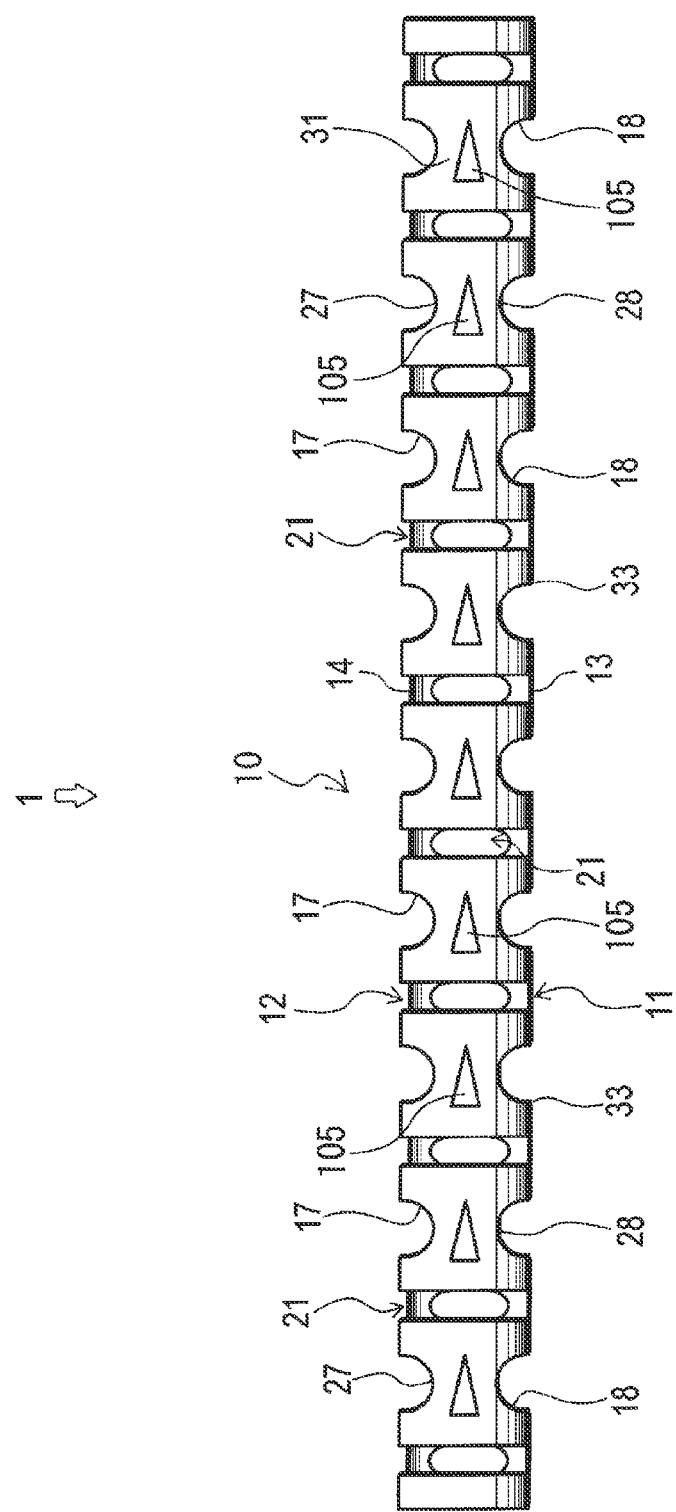
FIG. 4 is a plan view of the antistatic cover of FIG. 1.
Figure 5:
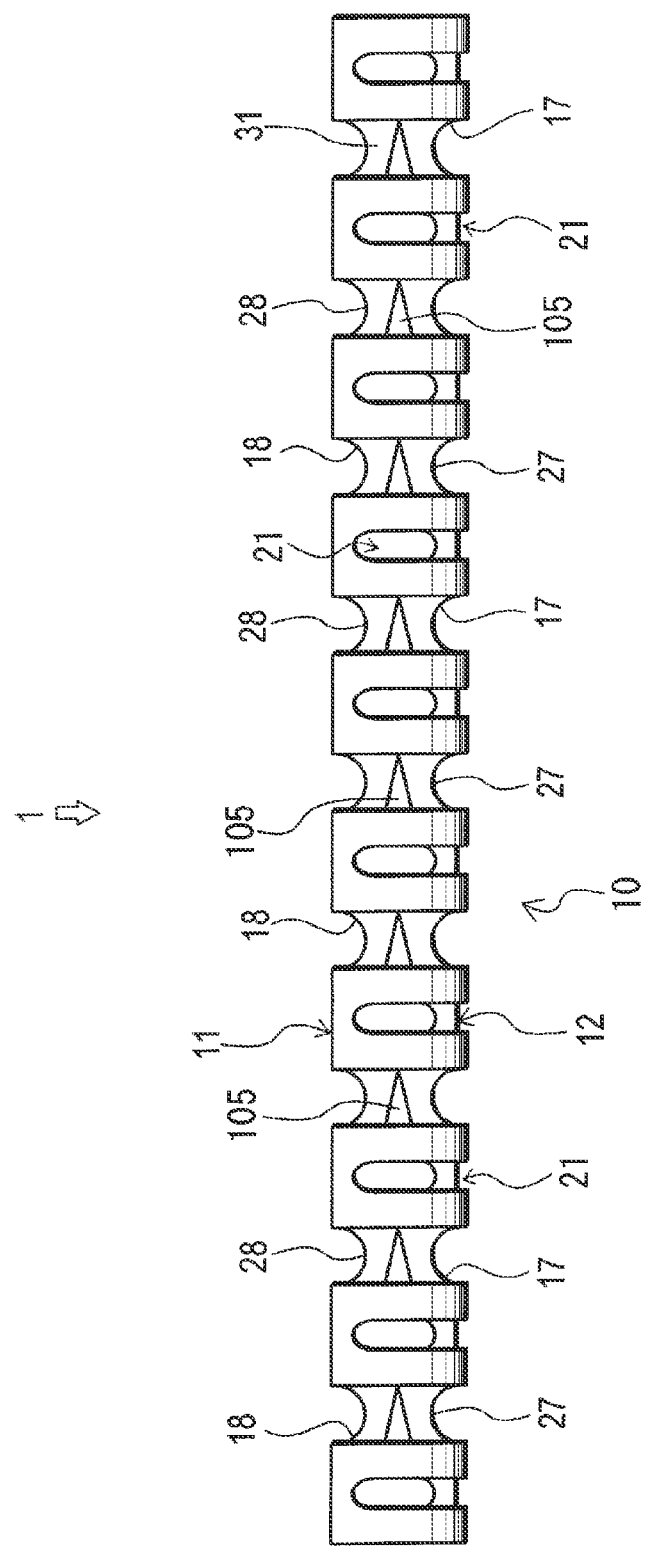
FIG. 5 is a bottom view of the antistatic cover of FIG. 1.
Figure 6:
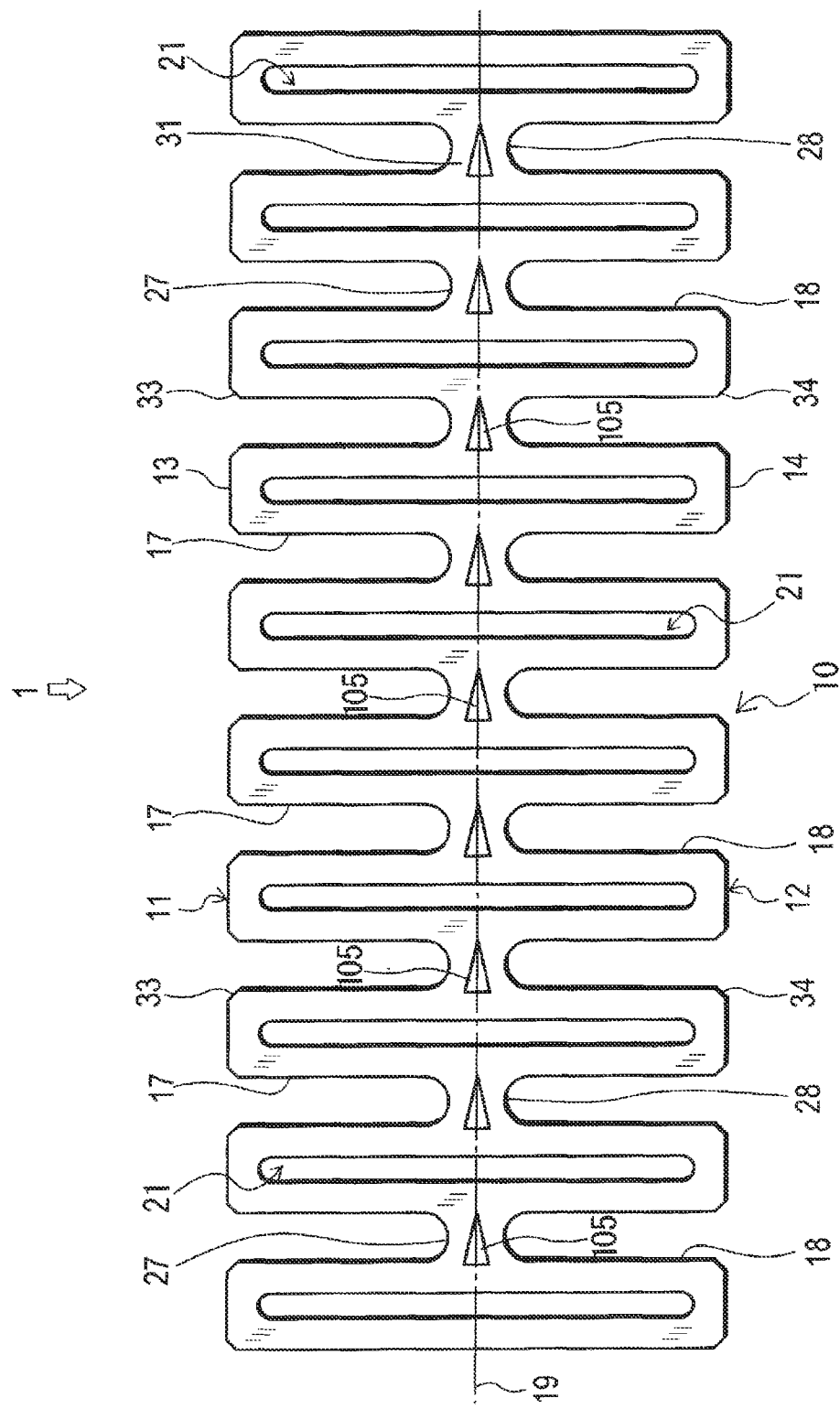
FIG. 6 is a development view of the antistatic cover of FIG. 1.

FIG. 2 is a front view of the antistatic cover 1, FIG. 3 is a side view of the antistatic cover 1, FIG. 4 is a plan view of the antistatic cover 1, FIG. 5 is a bottom view of the antistatic cover 1, and FIG. 6 is a development view of the antistatic cover 1. For the sake of convenience in description, FIG. 2 is enlargedly shown.

As shown in FIGS. 1 to 6, the antistatic cover 1 includes the cover body 10. The cover body 10 is configured by a resin composition containing a conductive material. An example of the resin composition is PP (polypropylene) containing a conductive material such as carbon black, carbon fibers, graphite, carbon filaments, fine metal powder, or a combination of two or more of these materials.

The cover body 10 is formed into a tubular shape which can be fitted onto the tube 2. The cover body 10 is divided in one place in the circumferential direction so as to form a 1-st divided portion 11 and a 2-nd divided portion 12, and elastically deformable in a manner that the 1-st divided portion 11 and the 2-nd divided portion 12 approach or separate from each other. In the embodiment, the cover body 10 is formed into a cylindrical shape.

The 1-st divided portion 11 is placed on the side of one circumferential end of the cover body 10. One circumferential end surface 13 which extends in the axial direction of the cover body 10 is formed in the 1-st divided portion 11. By contrast, the 2-nd divided portion 12 is placed on the side of the other circumferential end of the cover body 10. Another circumferential end surface 14 which extends in the axial direction of the cover body 10 is formed in the 2-nd divided portion 12.

The cover body 10 is configured so as to be elastically deformed in a manner that the 1-st divided portion 11 and the 2-nd divided portion 12 separate from each other, and allow the tube 2 to pass through between the 1-st divided portion 11 and the 2-nd divided portion 12. During the elastic deformation, the inner diameter (diameter width on the inner circumferential side) of the cover body 10 can be changed to be larger than the outer diameter of the tube 2.

Specifically, the cover body 10 is configured so as to be able to have a normal shape in which, as shown in FIG. 3, the 1-st divided portion 11 and the 2-nd divided portion 12 approach each other to a degree where the portions are in contact with each other. The normal shape is obtained in the case where the antistatic cover 1 is not attached to the tube 2. In the shape, the inner diameter of the cover body 10 is approximately equal to or smaller than the outer diameter of the tube 2.

Figure 7A:
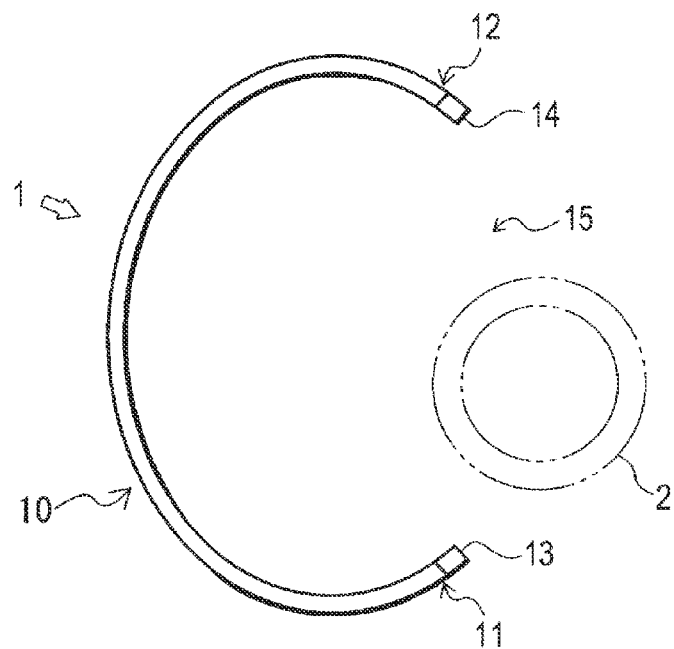
FIGS. 7A to 7C are side views showing a manner of attachment of the antistatic cover of FIG. 1 to a tube.

Moreover, the cover body 10 is configured so as to be able to have a deformed shape where, as shown in FIG. 7A, the 1-st divided portion 11 and the 2-nd divided portion 12 are separated from each other by elastic deformation so as to form a space 15 through which the tube 2 can pass, or a part of a circle is cut away in a side view. The deformed shape is a temporary shape which is formed in the case where the antistatic cover 1 is to be attached to or detached from the tube 2. In the shape, the inner diameter of the cover body 10 is larger than the above-described normal shape.

Figure 7B:
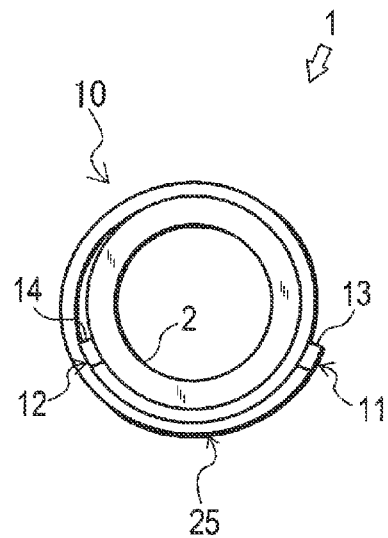

The cover body 10 is configured so as to be able to have a covering shape where, as shown in FIG. 7B, the 1-st divided portion 11 and the 2-nd divided portion 12 are moved in a direction in which the portions approach each other. The covering shape is a shape in the case where the antistatic cover 1 is attached to the tube 2. In the shape, the inner diameter of the cover body 10 is changed in accordance with the outer diameter of the tube 2.

In the configuration, in the case where the antistatic cover 1 is to be attached to the tube 2 to be used thereon, firstly, an external force for deforming the cover body 10 is applied to the antistatic cover 1. This causes the antistatic cover 1 to be changed from the normal shape shown in FIG. 3 to the deformed shape shown in FIG. 7A, thereby forming the space 15 through which the tube 2 can pass, between the 1-st divided portion 11 and the 2-nd divided portion 12.

Next, the tube 2 is moved from the space 15 which is located between the 1-st divided portion 11 and the 2-nd divided portion 12, toward the interior of the cover body 10. After the movement, the elastic restoration of the cover body 10 is advanced so as to be fitted onto the tube 2. As shown in FIGS. 1 and 7B, as a result, the antistatic cover 1 is changed to the covering shape, and the state where the cover body 10 covers and surrounds the tube 2 can be held.

In the case where the antistatic cover 1 is to be detached from the tube 2, by contrast, an external force for deforming the cover body 10 is applied to the antistatic cover 1. Then, the antistatic cover 1 is changed from the covering shape to the deformed shape, and the tube 2 is moved from the space 15 which is located between the 1-st divided portion 11 and the 2-nd divided portion 12, toward the outside of the cover body 10. As shown in FIG. 3, as a result, the antistatic cover 1 can be returned to the normal shape.

In the antistatic cover 1, the cover body 10 has a plurality of 1-st cutaway portions. The plurality of 1-st cutaway portions are used for exposing a part of the tube 2 when the cover body 10 is fitted onto the tube 2, and disposed so as to pass through at least one of the 1-st divided portion 11 and the 2-nd divided portion 12 in a radial direction of the cover body 10.

In the embodiment, as shown in FIGS. 4 and 5, the cover body 10 has a plurality of (1-1)-st cutaway portions 17, 17, . . . as the plurality of 1-st cutaway portions. The plurality of (1-1)-st cutaway portions 17, 17, . . . are disposed so as to pass through the 1-st divided portion 11 in a radial direction of the cover body 10. Here, the plurality of (1-1)-st cutaway portions 17, 17, . . . are formed by cutting away the 1-st divided portion 11 (one circumferential end surface 13).

The plurality of (1-1)-st cutaway portions 17, 17, . . . are placed at predetermined intervals in the axial direction of the cover body 10. Specifically, the plurality of (1-1)-st cutaway portions 17, 17, . . . are long-hole-like cutaway portions which have the same shape, and which extend from the one circumferential end surface 13 to the halfway (vicinity of the middle) in the circumferential direction of the cover body 10, and placed at substantially regular intervals in the axial direction of the cover body 10.

In the embodiment, the cover body 10 further has a plurality of (1-2)-nd cutaway portions 18, 18, . . . as the plurality of 1-st cutaway portions. The plurality of (1-2)-nd cutaway portions 18, 18, . . . are disposed so as to pass through the 2-nd divided portion 12 in a radial direction of the cover body 10. Here, the plurality of (1-2)-nd cutaway portions 18, 18, . . . are formed by cutting away the 2-nd divided portion 12 (other circumferential end surface 14).

The plurality of (1-2)-nd cutaway portions 18, 18, . . . are placed at predetermined intervals in the axial direction of the cover body 10. Specifically, the plurality of (1-2)-nd cutaway portions 18, 18, . . . are long-hole-like cutaway portions which have the same shape, and which extend from the other circumferential end surface 14 to the halfway (vicinity of the middle) in the circumferential direction of the cover body 10, and placed at substantially regular intervals in the axial direction of the cover body 10.

In the embodiment, the plurality of (1-2)-nd cutaway portions 18, 18, . . . are formed into approximately the same shape as the plurality of (1-1)-st cutaway portions 17, 17, . . . , and in the same number as the plurality of (1-1)-st cutaway portions 17, 17, . . . . As shown in FIG. 6, the plurality of (1-2)-nd cutaway portions 18, 18, . . . are placed symmetrically about the center line 19 in the shorter-side direction of the cover body 10 in the developed state.

In the antistatic cover 1, from the above, it is possible that, when the cover is to be attached to or detached from the tube 2, the cover body 10 is elastically deformed so as to widen the gap between the 1-st divided portion 11 and the 2-nd divided portion 12, and overlaid on or detached from the tube 2 from the side of one of them. Even when the tube 2 is an existing tube which has not yet been disposed at a predetermined position in a factory or the like, or that which has been disposed, therefore, the antistatic cover 1 can be easily attached to or detached from the tube 2. Consequently, attachment and detachment of the antistatic cover 1 to and from the tube 2 can be facilitated.

Figure 7C:
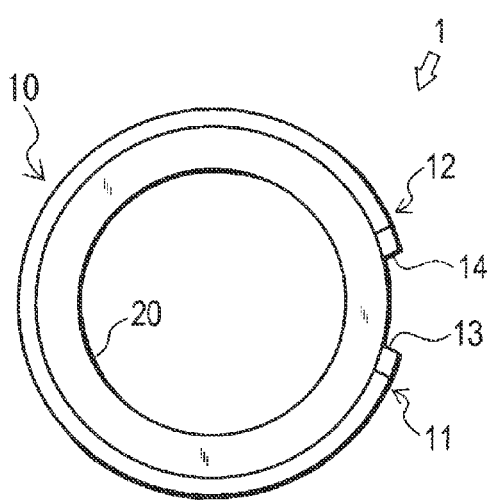

According to the antistatic cover 1, the elastic deformation of the cover body 10 is used in attachment to or detachment from the tube 2. Therefore, the antistatic cover 1 can be used not only in attachment to or detachment from the tube 2 having an outer diameter which is approximately equal to the inner diameter of the cover body 10 in the normal shape, but also in attachment to or detachment from, in a predetermined allowable range, a thick tube 20 having an outer diameter which is larger than the inner diameter of the cover body 10 as shown in FIG. 7C. Consequently, the antistatic cover 1 can be applied not only to one kind of tube having a predetermined outer diameter, but also to plural kinds of tubes having different outer diameters.

According to the antistatic cover 1, after attachment to the tube 2, the tube 2 can be covered by the cover body 10 with relatively no interruption and in a wide range. Even in the case where, since the tube 2 is the above-described thick tube 20, the whole circumference cannot be covered by the cover body 10 as shown in FIG. 7C, moreover, the cover body 10 is relatively rotated with respect to the tube 2 so as to cover necessary places of the tube 2. Even when a shifting of the fluid due to the installation situation of the tube 2, the flow rate of the fluid, or the like occurs in the tube 2, therefore, the tube 2 can be surely diselectrically charged. Consequently, the certainty of preventing the tube 2 from being electrically charged by using the antistatic cover 1 can be enhanced.

According to the antistatic cover 1, since the plurality of (1-1)-st cutaway portions 17, 17, . . . are disposed in the cover body 10 (in the embodiment, the plurality of (1-2)-nd cutaway portions 18, 18, . . . are further disposed), the antistatic cover 1 can be provided with flexibility. Even when the tube 2 is an existing tube which has been disposed in a factory or the like in a bent state, therefore, the antistatic cover 1 can be easily attached to the tube 2 while bending the cover in accordance with the tube 2.

When the tube 2 is covered by the antistatic cover 1, moreover, a part of the transparent or translucent tube 2 can be exposed through the plurality of (1-1)-st cutaway portions 17, 17, . . . (in the embodiment, further through the plurality of (1-2)-nd cutaway portions 18, 18, . . . ). After the tube 2 is covered by the antistatic cover 1, therefore, the state (for example, the clogging condition or flowing direction of the insulating fluid) in the tube 2 can be visually checked by using the plurality of (1-1)-st cutaway portions 17, 17, . . . (and the plurality of (1-2)-nd cutaway portions 18, 18, . . . ).

In the antistatic cover 1, as shown in FIGS. 1 to 6, the cover body 10 has a plurality of through holes 21, 21, . . . . The plurality of through holes 21, 21, . . . are used for, when the cover body 10 is fitted onto the tube 2, allowing a part of the tube 2 to be exposed, and disposed so as to pass through the cover body 10 in a radial direction.

In the embodiment, the plurality of through holes 21, 21, . . . are placed at predetermined intervals in the axial direction of the cover body 10. Specifically, the plurality of through holes 21, 21, . . . are long-hole-like through holes which have the same shape, and which extend between the one circumferential end surface 13 and the other circumferential end surface 14 in the circumferential direction of the cover body 10, and placed at substantially regular intervals in the axial direction of the cover body 10.

The plurality of through holes 21, 21, . . . are disposed so as to be adjacent to at least either of the plurality of (1-1)-st cutaway portions 17, 17, . . . and the plurality of (1-2)-nd cutaway portions 18, 18, . . . . The through holes and the cutaway portions 17, 18 are alternately placed in the axial direction. The through holes 21 are formed so as to have an axial direction width which is approximately equal to or smaller than the (1-1)-st cutaway portions 17 and the (1-2)-nd cutaway portions 18.

According to the configuration, when the tube 2 is covered by the antistatic cover 1, a part of the transparent or translucent tube can be exposed through the plurality of through holes 21, 21, . . . . After the tube 2 is covered by the antistatic cover 1, therefore, the state (for example, the clogging condition or flowing direction of the insulating fluid) in the tube 2 can be visually checked also through the plurality of through holes 21, 21, . . . . Consequently, it is possible to enhance the visibility of the interior of the tube 2 during the use of the antistatic cover 1.

Preferably, the plurality of through holes 21, 21, . . . is set so that the total sum of the axial direction widths of the plurality of through holes 21, 21, . . . and the plurality of (1-1)-st cutaway portions 17, 17, . . . (and the plurality of (1-2)-nd cutaway portions 18, 18, . . . ) is 30% or more of the axial direction width of the cover body 10 within the range where a failure related to attachment to the tube 2 or electrical charge prevention of the antistatic cover 1 does not occur.

In the antistatic cover 1, as shown in FIG. 3, the cover body 10 is formed into a tubular shape in the state where the 1-st divided portion 11 and the 2-nd divided portion 12 overlap with each other. In the embodiment, in the case where the antistatic cover 1 has the normal shape, the 2-nd divided portion 12 is placed in a radially inner side of the 1-st divided portion 11, and an overlap portion 25 where the 1-st divided portion 11 and the 2-nd divided portion 12 overlap each other is disposed in a part in the circumferential direction of the cover body 10.

At the timing when the antistatic cover 1 is changed from the normal state shown in FIG. 3 to the deformed state shown in FIG. 7A, the elastic deformation of the cover body 10 causes the 1-st divided portion 11 and the 2-nd divided portion 12 to be relatively moved in the circumferential direction of the cover body 10 so as to be separated from each other, and it is possible to ensure the space 15 having a gap through which the tube 2 can pass, between the 1-st divided portion 11 and the 2-nd divided portion 12.

According to the configuration, the change range of the inner diameter (diameter width on the inner circumferential side) which can be obtained in the cover body 10 in accordance with elastic deformation can be changed. Therefore, the antistatic cover 1 can be applied to larger kinds of tubes having different outer diameters.

In the antistatic cover 1, as shown in FIGS. 1, 4, and 6, the closed portion of at least one of the plurality of (1-1)-st cutaway portions 17, 17, . . . and the plurality of (1-2)-nd cutaway portions 18, 18, . . . is rounded. In the embodiment, the closed portions 27, 28 of the plurality of (1-1)-st cutaway portions 17, 17, . . . and the plurality of (1-2)-nd cutaway portions 18, 18, . . . are rounded.

As shown in FIG. 6, the closed portions 27 of the (1-1)-st cutaway portions 17 and the closed portion 28 of the (1-2)-nd cutaway portions 18 are formed into shapes which are symmetric about the center line 19 in the shorter-side direction of the cover body 10 in the developed state. Specifically, the closed portions 27 of the (1-1)-st cutaway portions 17 are formed into a bent (arcuate) shape which is convex toward the 2-nd divided portion 12. The closed portion 28 of the (1-2)-nd cutaway portions 18 are formed into a bent (arcuate) shape which is convex toward the 1-st divided portion 11.

According to the configuration, it is possible to form at least one winding portion 31 around which a metal wire 30 such as a copper wire that is to be connected to a ground line can be wound, between (near) the closed portions 27, 28 in the cover body (see FIG. 1). In the case where the metal wire 30 is wound around the winding portion 31, it is possible to prevent the metal wire 30 from injuring the closed portions 27, 28 contacting therewith, and the antistatic cover 1 is hardly damaged.

In the antistatic cover 1, as shown in FIGS. 1 and 3, a chamfering process is applied to opening edges 33, 34 of the plurality of (1-1)-st cutaway portions 17, 17, . . . and the plurality of (1-2)-nd cutaway portions 18, 18, . . . . Namely, the opening edges 33, 34 which are located in the one circumferential end surface 13 and the other circumferential end surface 14 are chamfered.

According to the configuration, in the case where, for example, the antistatic cover 1 is attached to or detached from the tube 2, damage due to contact between the cover body 10 and the tube 2 is caused to hardly occur in the tube 2.

In the embodiment, the plurality of 1-st cutaway portions in the invention are configured by the plurality of (1-1)-st cutaway portions 17, 17, . . . and (1-2)-nd cutaway portions 18, 18, . . . which are formed in the 1-st divided portion 11 and the 2-nd divided portion 12. Alternatively, the 1-st cutaway portions may be configured by a plurality of cutaway portions which are formed in only one of the 1-st and 2-nd divided portions.

The plurality of 1-st cutaway portions in the invention are configured by the plurality of (1-1)-st cutaway portions 17, 17, . . . and (1-2)-nd cutaway portions 18, 18, . . . which are long-hole-like cutaway portions. The 1-st cutaway portions are requested that, when the cover body is fitted onto the tube, they allow a part of the tube to be exposed. For example, the 1-st cutaway portions may be configured by a plurality of arcuate cutaway portions which are shorter in the circumferential direction of the cover body than those in the embodiment.

The plurality of 1-st cutaway portions in the invention are configured by the plurality of (1-1)-st cutaway portions 17, 17, . . . and (1-2)-nd cutaway portions 18, 18, . . . which have approximately the same shape. The 1-st cutaway portions are not limited to this configuration. Alternatively, the 1-st cutaway portions may be configured by a plurality of cutaway portions having different shapes, or those including a group of cutaway portions having a predetermined shape and other cutaway portions having a shape which is different from the predetermined shape.

The plurality of through holes in the invention are configured by the plurality of through holes 21, 21, . . . which are long-hole-like through holes. The through holes are requested that, when the cover body is fitted onto the tube, they allow a part of the tube to be exposed through the through holes. For example, the through holes may be configured by a plurality of through holes which are shorter in the circumferential direction of the cover body than those in the embodiment.

In the embodiment, the plurality of through holes in the invention are configured by the plurality of through holes 21, 21, . . . which have approximately the same shape. The through holes are not limited to this configuration. For example, the through holes may be configured by a plurality of through holes having different shapes, or those including a group of through holes having a predetermined shape, and other through holes having a shape which is different from the predetermined shape.

The number of the 1-st cutaway portions in the invention is not limited to that (nine) in the embodiment. Alternatively, the number may be arbitrarily set in consideration of the visibility of the interior of the tube. The number of the through holes in the invention is not limited to that (ten) in the embodiment. Alternatively, the number may be arbitrarily set in consideration of the necessity for visibility of the interior of the tube.

In the antistatic cover 1, as shown in FIGS. 1, 2, and 4 to 6, an indication 105 relating to the fluid flowing through the tube 2 is disposed at a position of the cover body 10 which can be seen from the outside. In the embodiment, a plurality of indications are disposed as the indication 105, and the indications 105, 105, . . . are disposed integrally with the outer circumferential surface of the cover body 10.

As shown in FIG. 1 and the like, for example, the plurality of indications 105, 105, . . . are arrows indicating the direction (flowing direction) in which the fluid is to flow in the tube 2, and formed by slits, recesses, projections, or the like (in the embodiment, slits) disposed in the cover body 10. In the embodiment, all the plurality of indications 105, 105, . . . have the same shape.

Furthermore, the plurality of indications 105, 105, . . . are arranged in approximately one row along the axial direction of the cover body 10, and each of the indications is placed so as to be separated from the adjacent indications 105 by a predetermined distance. In the plurality of indications 105, 105, . . . , the indications 105, 105 which are located at the both ends are placed near the one and other end portions in the longitudinal direction of the cover body 10, respectively.

According to the configuration, when the cover body 10 is attached to the tube 2 so as to cover the tube 2, the indications 105 can be lately added to the tube 2 in an easy and stable manner. In the case where the indications 105 are to be added to the tube 2, when the antistatic cover 1 is attached to the tube 2 so that the indications 105 are placed at positions of high visibility, the easiness of identification of the indications 105 can be enhanced.

In the embodiment, the indication in the invention is realized by the indications 105 which are disposed in only one place in the circumferential direction of the cover body 10. The identification is not limited to this. As shown in FIG. 8, for example, indications may be arranged at regular intervals in the circumferential direction of the cover body 116, as indications 117 of an antistatic cover 110 of another embodiment of the invention.

In the embodiment, the indication in the invention is realized by the indications 105 which are substantially monochrome. The identification is not limited to this. For example, the indication may be colored in accordance with the kind of the fluid, so that the kind of the fluid flowing through the tube 2 can be known based on the color.

In the embodiment, the indication in the invention is realized by the indications 105 each of which is configured only by an arrow. The identification is not limited to this. For example, the indication may be a character(s) indicating the flowing direction of the fluid, that indicating the kind of the fluid, or a combination of a symbol such as an arrow and a character(s) indicating information relating to the fluid.

Next, a second embodiment of the invention will be described with reference to the drawings.

Figure 9:
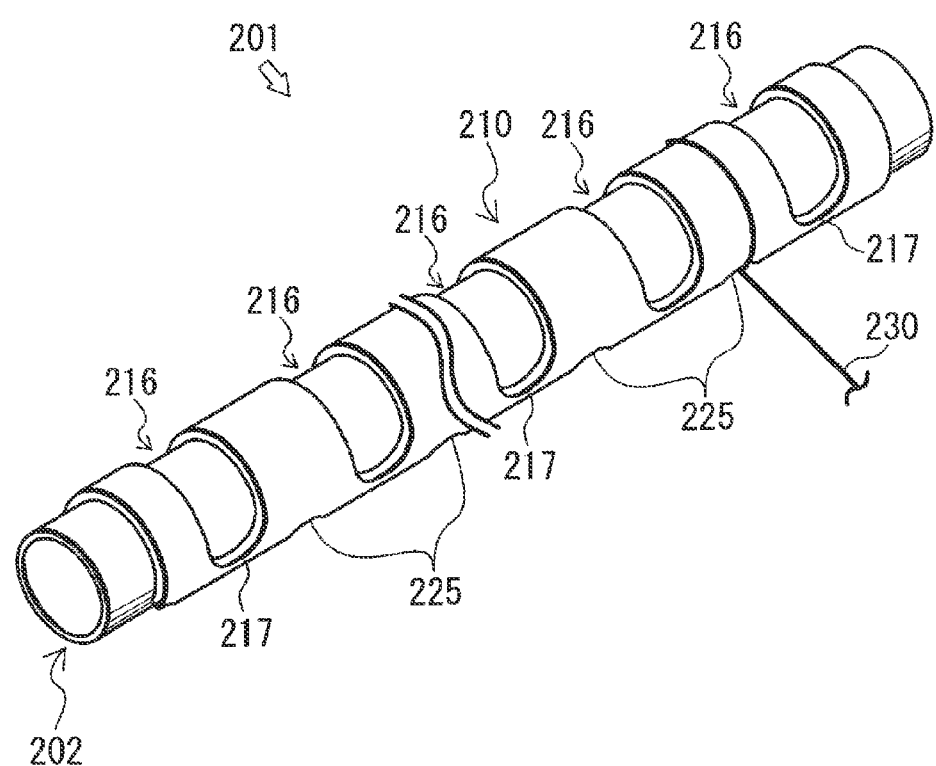
FIG. 9 is a view showing a use state of an antistatic cover of a second embodiment of the invention.

FIG. 9 shows a use state of an antistatic cover 201 of the second embodiment of the invention.

As shown in FIG. 9, for example, the antistatic cover 201 can be used on an existing tube 202 which has been disposed to allow a combustible fluid (electrically insulating fluid) such as an organic solvent to flow therethrough in an apparatus for producing a semiconductor, liquid crystal, an organic EL or the like. The antistatic cover 201 can be fitted onto the tube 202 so as to cover the whole circumference of the tube 202, and is formed as a whole so as to have a tubular shape in conformity with the tube 202.

The tube 202 is an insulating resin-made tube. In the embodiment, the tube is made of a fluororesin (for example, PFA (perfluoro alkoxyalkane)). The tube 202 is transparent or translucent to allow the interior to be visible from the outside, formed into a cylindrical shape having a substantially constant diameter, and configured so that both end portions in the axial direction can be connected to predetermined devices (connection targets) of the production apparatus, respectively.

Figure 10:
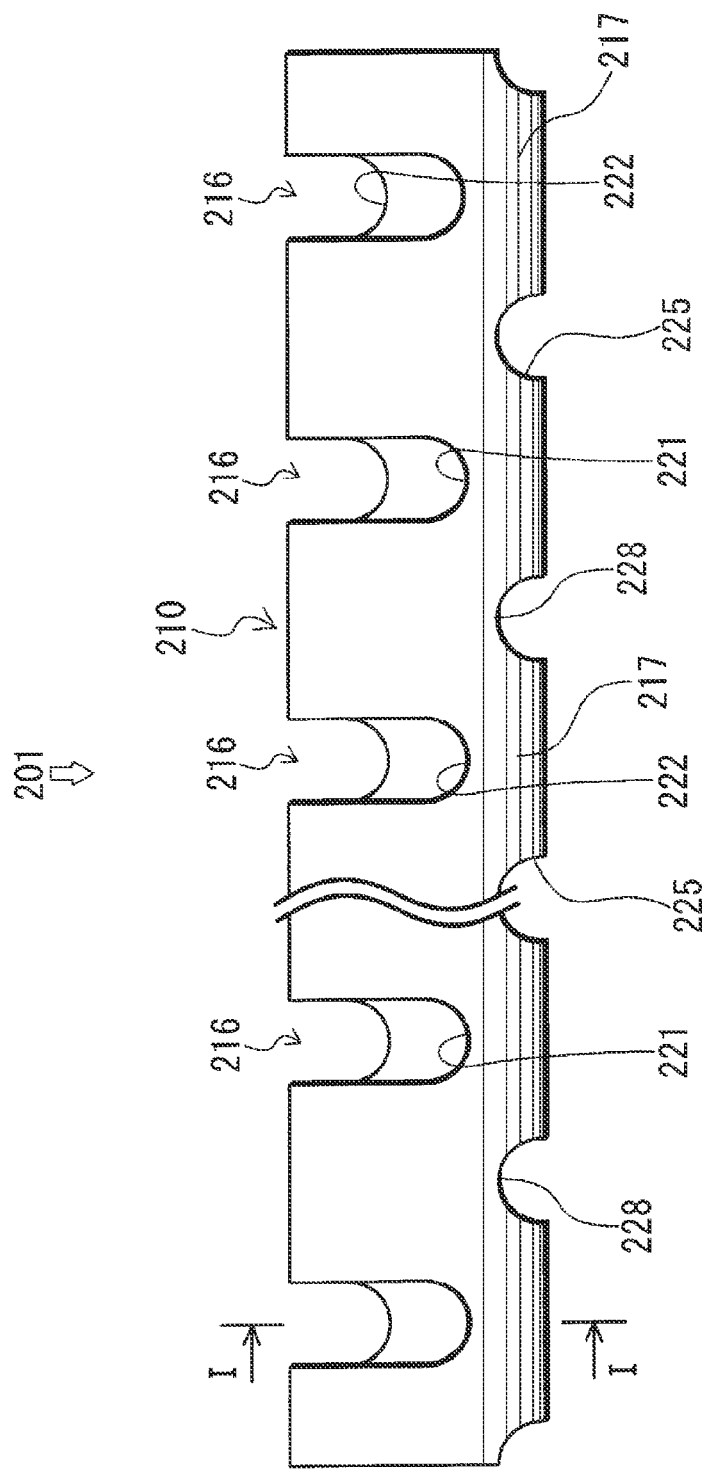
FIG. 10 is a front view of the antistatic cover of FIG. 9.
Figure 11:
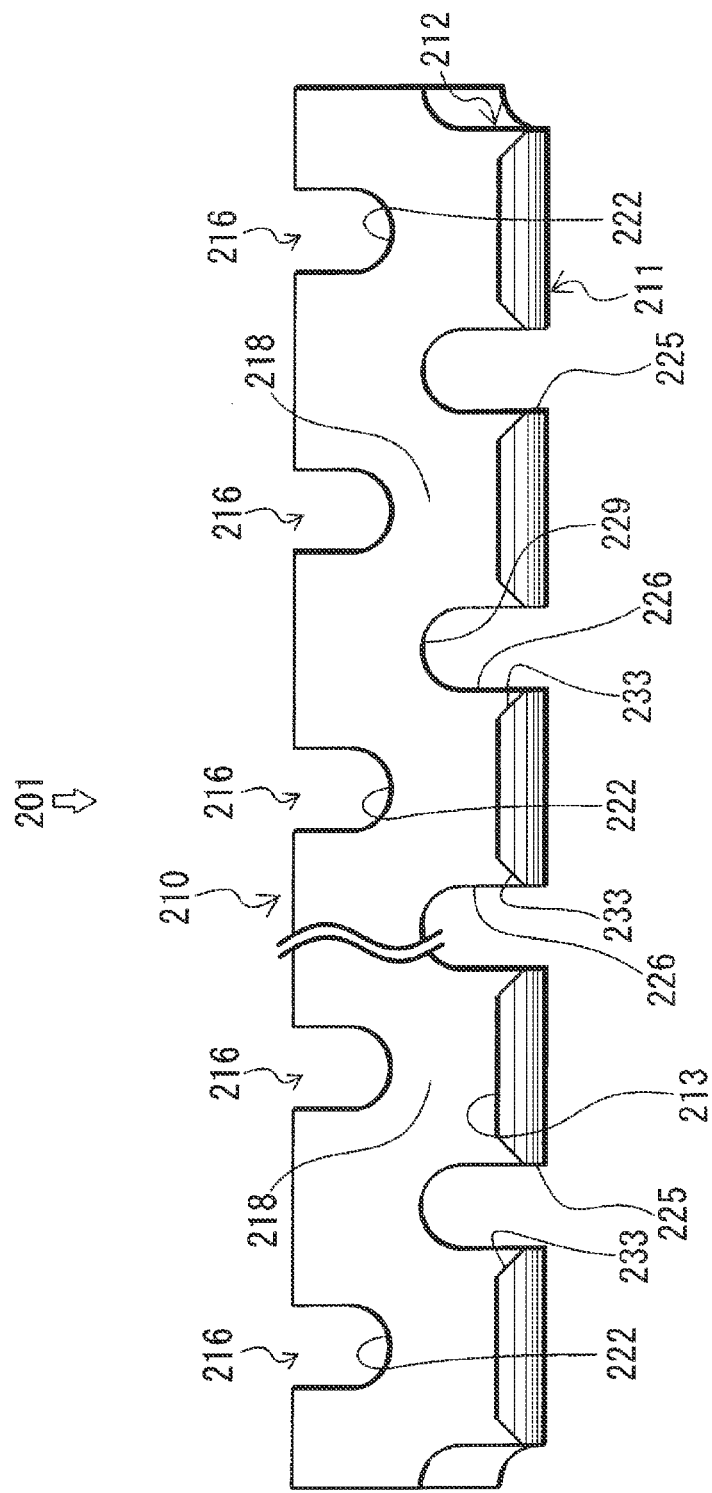
FIG. 11 is a back view of the antistatic cover of FIG. 9.
Figure 12A:
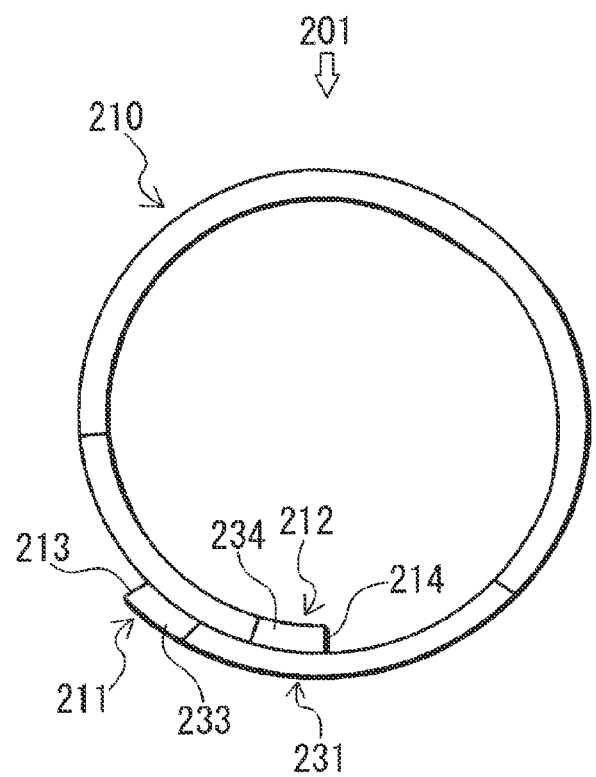
FIG. 12A is a side view of the antistatic cover of FIG. 9.
Figure 12B:
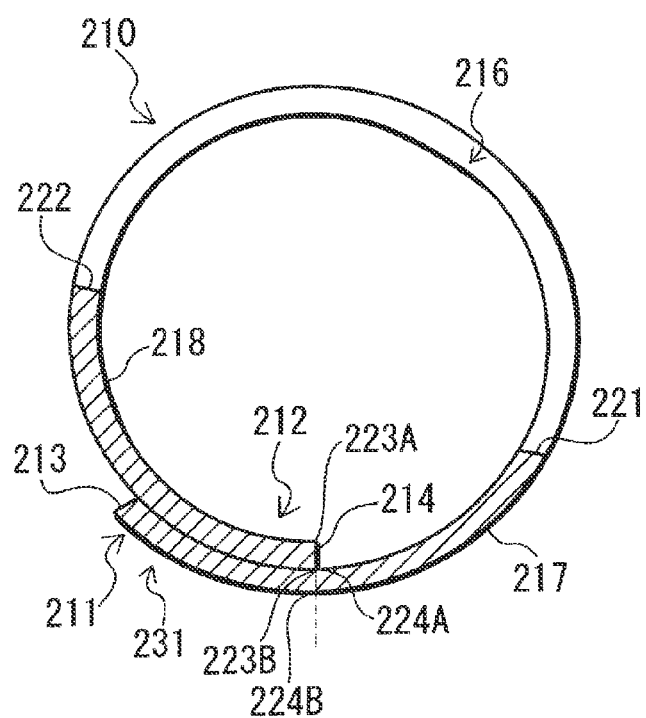
FIG. 12B is a sectional view taken along line I-I in FIG. 10.
Figure 13:
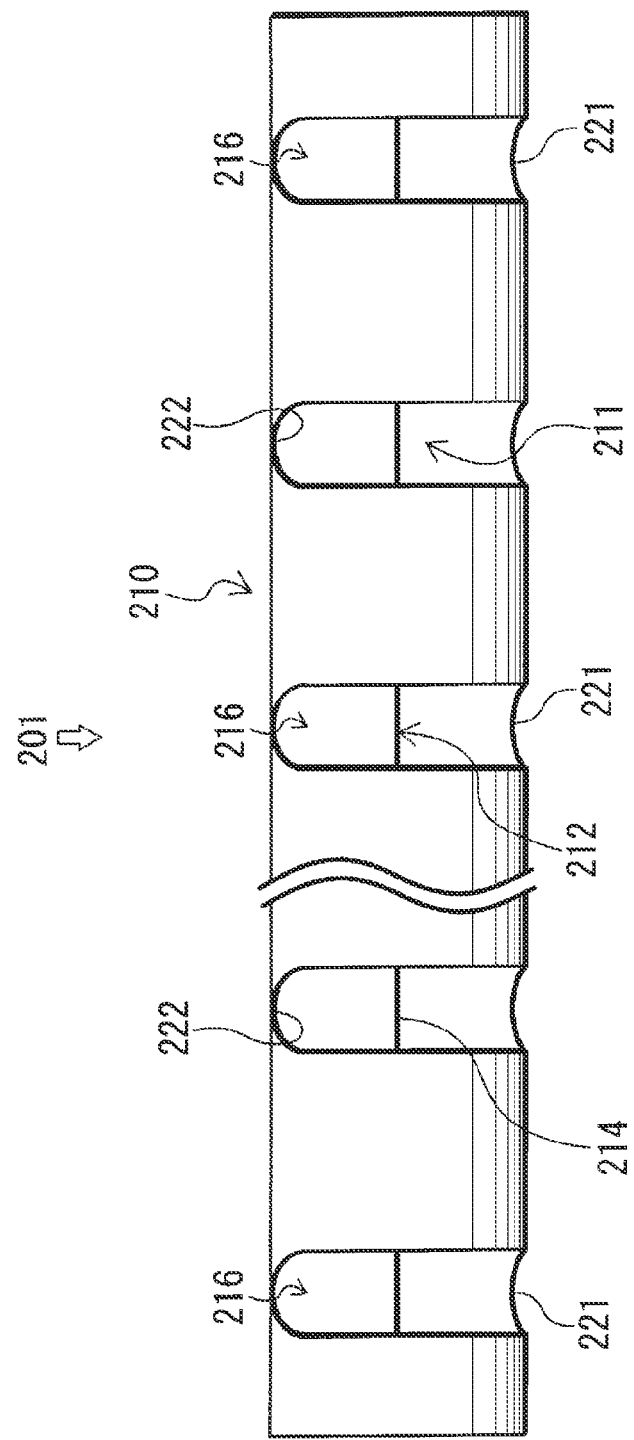
FIG. 13 is a plan view of the antistatic cover of FIG. 9.
Figure 14:
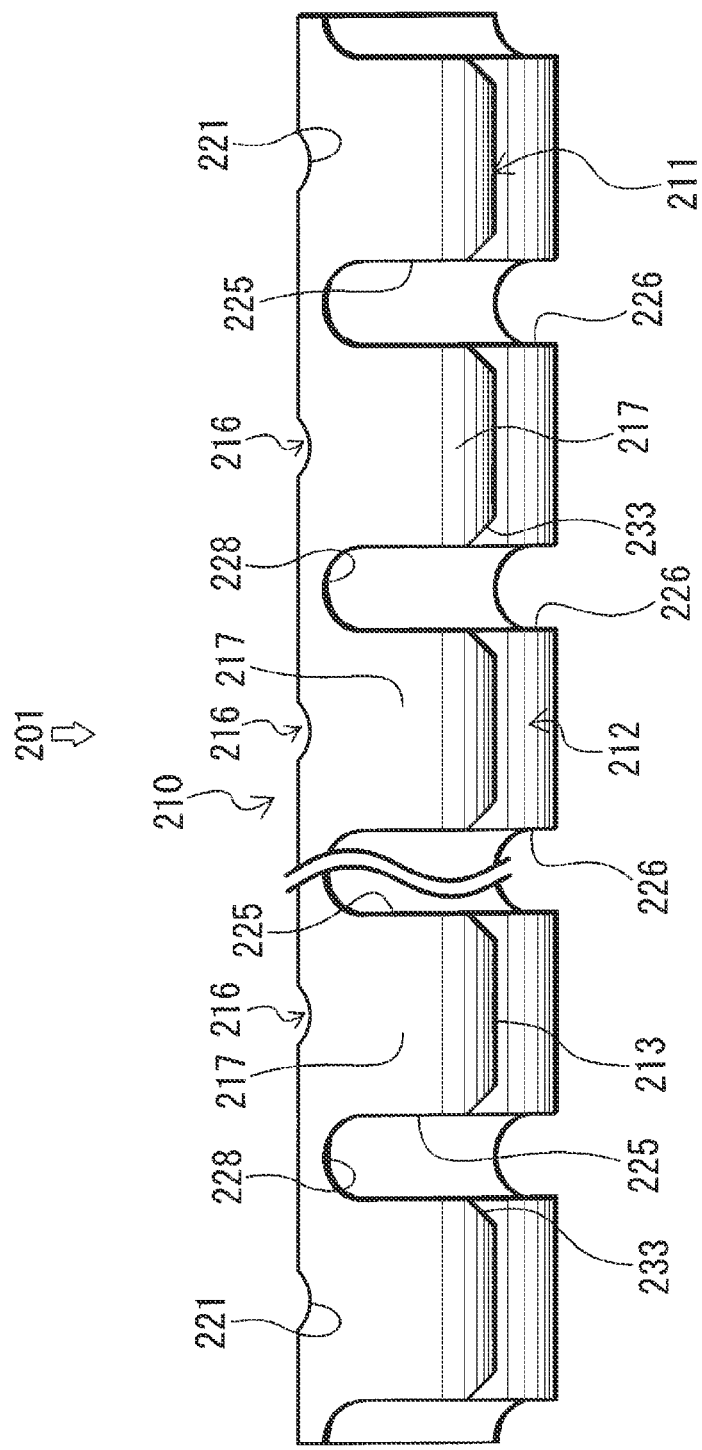
FIG. 14 is a bottom view of the antistatic cover of FIG. 9.
Figure 15:
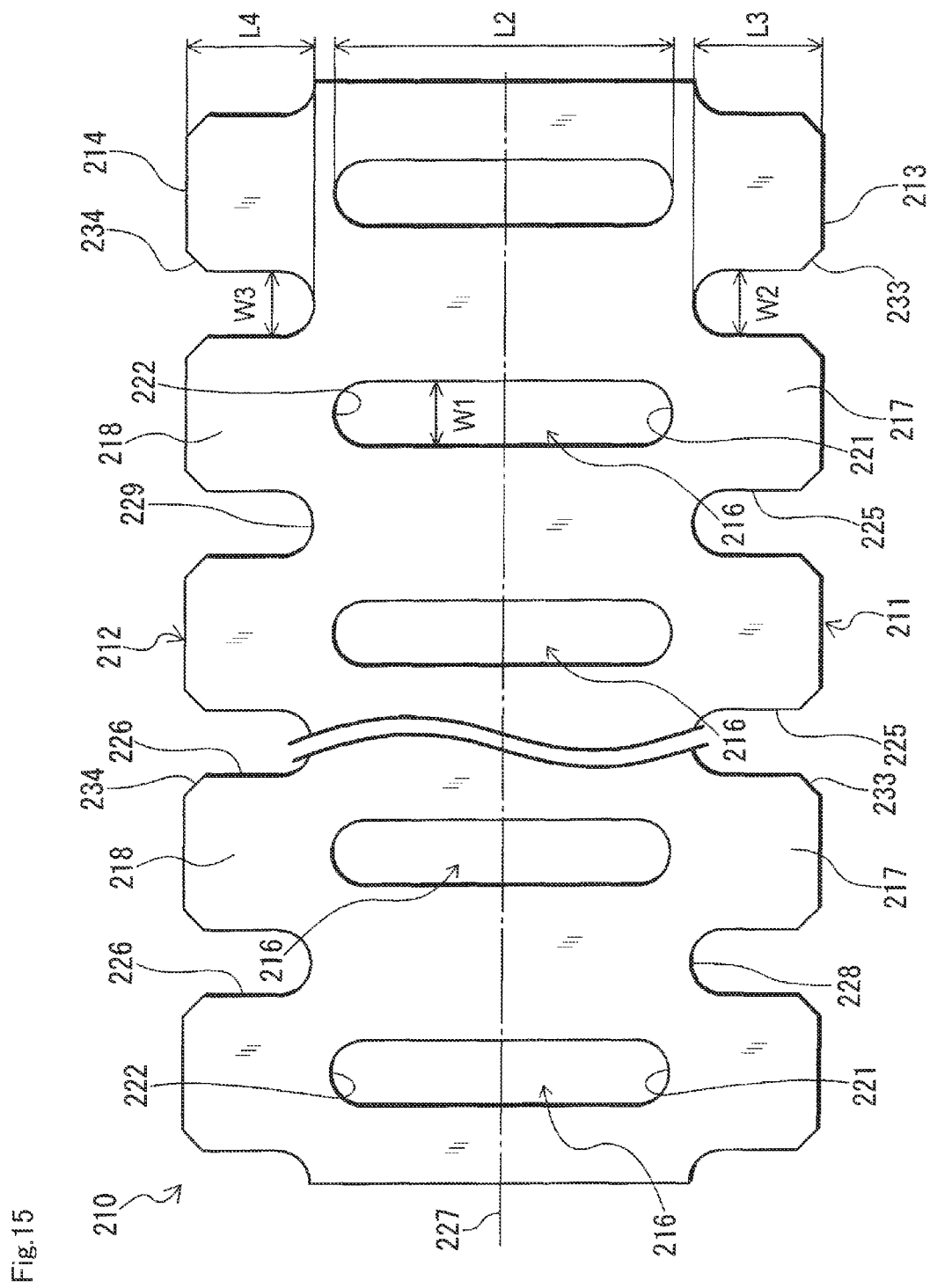
FIG. 15 is a development view of the antistatic cover of FIG. 9.
Figure 16A:
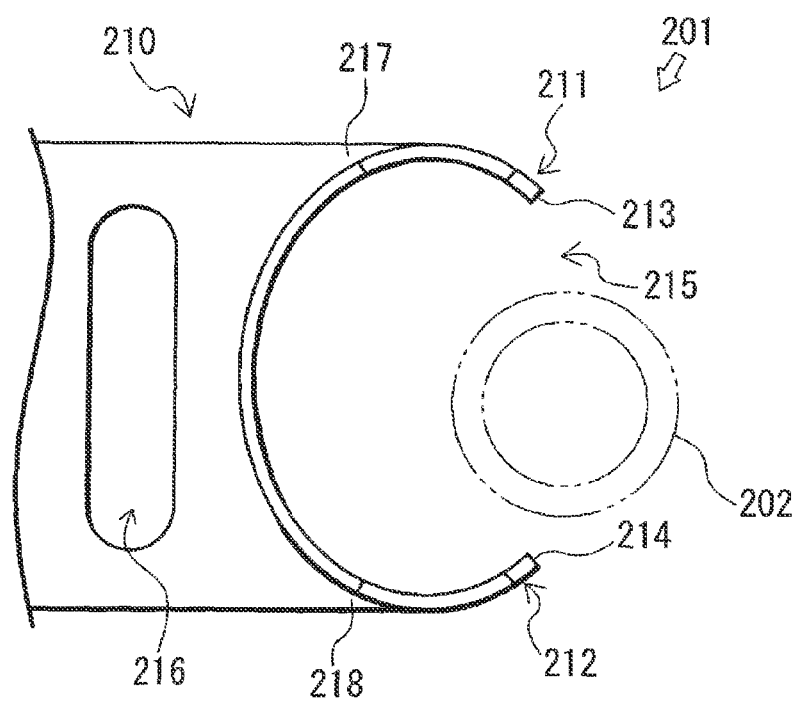
FIG. 16A is a view of a state immediately before attachment of the antistatic cover of FIG. 9 to a tube.
Figure 16B:
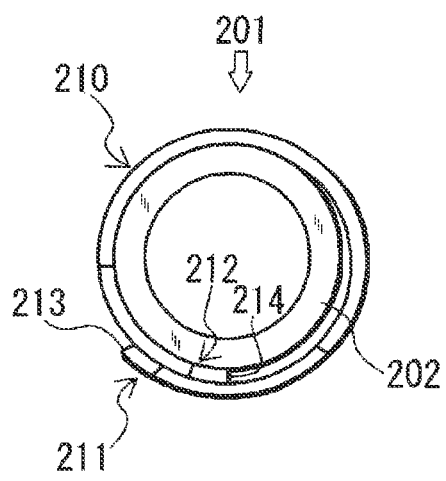
FIG. 16B is a view of a state after attachment of the antistatic cover of FIG. 9 to the tube.

FIG. 10 is a front view of the antistatic cover 201, FIG. 11 is a back view of the antistatic cover 201, FIGS. 12A and 12B are side and side sectional views of the antistatic cover 201, FIG. 13 is a plan view of the antistatic cover 201, FIG. 14 is a bottom view of the antistatic cover 201, FIG. 15 is a development view of the antistatic cover 201, and FIGS. 16A and 16B are side views showing a manner of attachment of the antistatic cover 201 to the tube 202.

As shown in FIGS. 9 to 15, the antistatic cover 201 includes the cover body 210. The cover body 210 is configured by a resin composition containing a conductive material. In the embodiment, the cover body 210 is configured by PP (polypropylene) containing carbon black.

In the invention, the resin composition containing a conductive material is not limited to PP containing carbon black used in the embodiment, and may be a resin composition such as PP or PE (polyethylene) containing a conductive material such as carbon fibers, graphite, fine metal powder, or a combination of two or more of these materials.

The cover body 210 is formed into a tubular shape which can cover the whole circumference of the tube 202. The cover body 210 is divided in one place in the circumferential direction so as to form a 1-st divided portion 211 and a 2-nd divided portion 212, and elastically deformable in a manner that, as shown in FIG. 16A, a gap 215 through which the tube 202 can pass is formed between the 1-st divided portion 211 and the 2-nd divided portion 212.

In the embodiment, the cover body 210 has the 1-st divided portion 211 on the side of one circumferential end of the cover body 210, and the 2-nd divided portion 212 on the side of the other circumferential end of the cover body 210. The cover body 210 is formed so as to have a cylindrical shape which can cover a substantial whole of the tube 202 in a state where the 1-st divided portion 211 and the 2-nd divided portion 212 overlap or adjoin each other.

One circumferential end surface 213 which extends in the axial direction of the cover body 210 is disposed in the 1-st divided portion 211. The one circumferential end surface 213 is formed into a planar shape which extends along the axis of the cover body 210, and which tolerates a certain level of convexes and concaves. By contrast, another circumferential end surface 214 which extends in the axial direction of the cover body 210 is formed in the 2-nd divided portion 212. The other circumferential end surface 214 is formed into a planar shape which extends along the axis of the cover body 210, and which tolerates a certain level of convexes and concaves.

The cover body 210 is configured so as to, by using elastic deformation, selectively have one of a shape where the 1-st divided portion 211 and the 2-nd divided portion 212 are close to each other so as to exhibit a cylindrical shape, and that where the portions separate from each other so that the gap 215 is formed between the 1-st divided portion 211 and the 2-nd divided portion 212 while the inner diameter (diameter width on the inner circumferential side) of the cover body 210 is changed to be larger than the outer diameter of the tube 202.

Specifically, the cover body 210 is configured so as to be able to have a normal shape in which, as shown in FIGS. 12A and 12B, the 1-st divided portion 211 and the 2-nd divided portion 212 approach to contact each other. The normal shape is a shape which is attained during a period when the cover body 210 does not surround the tube 202, or the antistatic cover 201 is not used. In the normal shape, the inner diameter of the cover body 210 is approximately equal to or smaller than the outer diameter of the tube 202.

In the normal shape, the cover body 210 is in a natural state, and configured so that the length of one circumference is L1. The length L1 is defined by the following expression:

$$\text{Length } L1=(L1a+L1b)\times\tfrac{1}{2}$$

where L1a indicates the length of one circumference which, on the outer circumferential surface of the cover body 210, circumferentially extends from the start position 223A of the other circumferential end surface 214 to the end position 223B on the side of the one circumferential end surface 213 (see FIG. 12B), and L1b indicates the length of one circumference which, on the inner circumferential surface of the cover body 210, circumferentially extends from the start position 224A of the other circumferential end surface 214 to the end position 224B on the side of the one circumferential end surface 213 (see FIG. 12B).

The cover body 210 is configured so as to be able to have a deformed shape where, as shown in FIG. 16A, the 1-st divided portion 211 and the 2-nd divided portion 212 are separated from each other so as to form the gap 215, or a part of an ellipse is cut away in a side view. The deformed shape is a temporary shape which is formed in the case where the cover body 210 is to be attached to or detached from the tube 202. In the deformed shape, the inner diameter of the cover body 210 is larger than that in the above-described normal shape.

The cover body 210 is configured so as to be able to have a covering shape where, as shown in FIG. 16B, the 1-st divided portion 211 and the 2-nd divided portion 212 approach to contact each other. The covering shape is a shape which is attained during a period when the cover body 210 surrounds the whole circumference of the tube 202, or the antistatic cover 201 is used. In the covering shape, the inner diameter of the cover body 210 is changed in accordance with the outer diameter of the tube 202.

According to the configuration, the antistatic cover 201 can be attached to and detached from the tube 202. In the case where the antistatic cover 201 is to be attached to the tube 202, firstly, an external force for deforming the cover body 210 is applied to the antistatic cover 201. This causes the antistatic cover 201 to be changed from the normal shape to the deformed shape, thereby forming the gap 215 through which the tube 202 can pass, between the 1-st divided portion 211 and the 2-nd divided portion 212.

Then, the tube 202 is moved from the gap 215 which is located between the 1-st divided portion 211 and the 2-nd divided portion 212, toward the interior of the cover body 210. After the movement, the cover body 210 is elastically deformed so as to be fitted onto the tube 202. As shown in FIGS. 9 and 16B, as a result, the cover body 210 is changed to the covering shape, and the work of attaching the antistatic cover 201 can be completed.

In the case where the antistatic cover 201 is to be detached from the tube 202, by contrast, an external force for deforming the cover body 210 is applied to the antistatic cover 201. Then, the antistatic cover 201 is changed from the covering shape to the deformed shape, and the tube 202 is moved from the gap 215 toward the outside of the cover body 210. As shown in FIG. 12A, as a result, the antistatic cover 201 can be returned to the normal shape, and the work of detaching the antistatic cover 201 can be completed.

In the antistatic cover 201, as shown in FIGS. 9 to 15, the cover body 210 has 2-nd cutaway portions 216. The 2-nd cutaway portions 216 are disposed along the circumferential direction of the cover body 210 between the 1-st divided portion 211 and the 2-nd divided portion 212 of the cover body 210. The 2-nd cutaway portions 216 have a length L2 which is 40% or more of the above-described length L1 of the one circumference of the cover body 210, in the circumferential direction of the cover body 210.

In the embodiment, each of the 2-nd cutaway portions 216 is configured by one long-hole-like through hole which passes through the cover body 210 in a radial direction of the body. The 2-nd cutaway portions 216 have a predetermined axial width W1, and are disposed inside peripheral edge portions of the cover body 210.

In the cover body 210, first small-width portions 217 (hereinafter, "first small-width portion" is referred to as "1-st small-width portion") are formed between the 2-nd cutaway portions 216 (hereinafter, "second small-width portion" is referred to as "2-nd small-width portion") and the one circumferential end surface 213 of the 1-st divided portion 211. In the cover body 210, moreover, 2-nd small-width portions 218 are formed between the 2-nd cutaway portions 216 and the other circumferential end surface 214 of the 2-nd divided portion 212.

The 1-st small-width portions 217 and the 2-nd small-width portions 218 have a circumferential length by which, even when the cover body 210 is bent in the axial direction, the coupling between regions that are in the cover body 210, and that are respectively on the both axial sides across the 2-nd cutaway portions 216 is maintained in the circumferential direction of the cover body 210 (for example, the length is equivalent to, two times, or five times the thickness of the cover body 210).

Preferably, the radial depth of the 2-nd cutaway portions 216, i.e., the thickness of the cover body 210 is set to a predetermined value which is in a range of 0.5 mm to 2 mm.

According to the configuration, when the antistatic cover 201 is to be applied to the existing tube 202, the antistatic cover 201 can cover the substantially whole of the tube 202 so that the cover body 210 surrounds the whole circumference of the tube 202, and hence it is possible to block the tube 202 from being electrically charged, irrespective of the flow rate of the fluid flowing through the tube 202. Therefore, the tube 202 can be provided with the electrical charge preventing performance by using the antistatic cover 201.

When the antistatic cover 201 is to be attached to or detached from the tube 202, the cover body 210 is deformed so as to widen the gap between the 1-st divided portion 211 and the 2-nd divided portion 212, and can be overlaid on or detached from the tube 202 from the side of one of them. Even when the tube 202 has been connected to predetermined devices of the production apparatus, therefore, the antistatic cover 201 can be easily attached to or detached from the tube 202.

In the cover body 210, moreover, the 1-st small-width portions 217 and the 2-nd small-width portions 218 can be formed by the 2-nd cutaway portions 216, and hence the cover body 210 can be formed so as to be easily bent in the axial direction. Even in the case where the tube 202 is disposed in a state where it has been bent in the axial direction, therefore, the cover body 210 can be easily bent in conformity with the tube 202 in the bent state. Consequently, attachment and detachment of the antistatic cover 201 to and from the tube 202 can be facilitated.

In the embodiment, as shown in FIGS. 9 to 15, the plurality of 2-nd cutaway portions 216 are disposed in the axial direction of the cover body 210. The plurality of 2-nd cutaway portions 216 are placed at regular intervals in the area extending from one end side of the axial direction of the cover body 210 to the other end side. The intervals between the adjacent 2-nd cutaway portions 216, 216 are matched so as to be substantially equal to one another.

According to the configuration, the cover body 210 can be formed so as to be bent more easily in the axial direction.

In the embodiment, as shown in FIGS. 10, 11, 14, and 15, the cover body 210 has at least one 3-rd cutaway portion which is different from the 2-nd cutaway portions 216. The 3-rd cutaway portion is placed in at least one of the 1-st divided portion 211 and the 2-nd divided portion 212, and between the adjacent 2-nd cutaway portions 216, 216.

Specifically, the 3-rd cutaway portion includes a plurality of (3-1)-st cutaway portions 225 in the 1-st divided portion 211, and a plurality of (3-2)-nd cutaway portions 226 in the 2-nd divided portion 212. The (3-1)-st cutaway portions 225 and the (3-2)-nd cutaway portions 226 have lengths L3, L4 in the circumferential direction of the cover body 210, respectively, and placed alternately at regular intervals so as to overlap or not to overlap (in the embodiment, so as not to overlap) with the 2-nd cutaway portions 216 in the axial direction of the cover body 210.

The (3-1)-st cutaway portions 225 are recesses which are formed by cutting away the cover body 210 so as to pass through the cover body in a radial direction, and extend from the one circumferential end surface 213 of the 1-st divided portion 211 toward a middle portion in the circumferential direction of the cover body 210. The (3-1)-st cutaway portions 225 have an approximately constant axial width W2 which is approximately equal to or larger than the axial width of the 2-nd cutaway portions 216 (in the embodiment, approximately equal to the width).

The (3-2)-nd cutaway portions 226 are recesses which are formed by cutting away the cover body 210 so as to pass through the cover body in a radial direction, and extend from the other circumferential end surface 214 of the 2-nd divided portion 212 toward a middle portion in the circumferential direction of the cover body 210. The (3-2)-nd cutaway portions 226 have an approximately constant axial width W3 which is approximately equal to or larger than the axial width of the 2-nd cutaway portions 216 (in the embodiment, approximately equal to the width).

The (3-2)-nd cutaway portions 226 are disposed in the same number as the (3-1)-st cutaway portions 225. As shown in FIG. 15, the (3-2)-nd cutaway portions 226 are placed symmetrically with the (3-1)-st cutaway portions 225 about the shorter-side direction center line 227 of the cover body 210 in a development state of the antistatic cover 201, and cooperate with the (3-1)-st cutaway portions 225 which are continuous to the cutaway portions in the case where the cover body 210 has the normal shape or the covering shape, to make it possible to form through holes.

According to the configuration, the cover body 210 can be more easily bent in the axial direction while sufficiently ensuring the electrical charge preventing performance that is provided to the tube 202 by the antistatic cover 201. In the case where the cover body 210 surrounds the tube 202, when the tube 202 is transparent or translucent, the state in the tube 202 can be visually checked through the 3-rd cutaway portions (above-described (3-1)-st cutaway portions 225 and (3-2)-nd cutaway portions 226).

Figure 17:
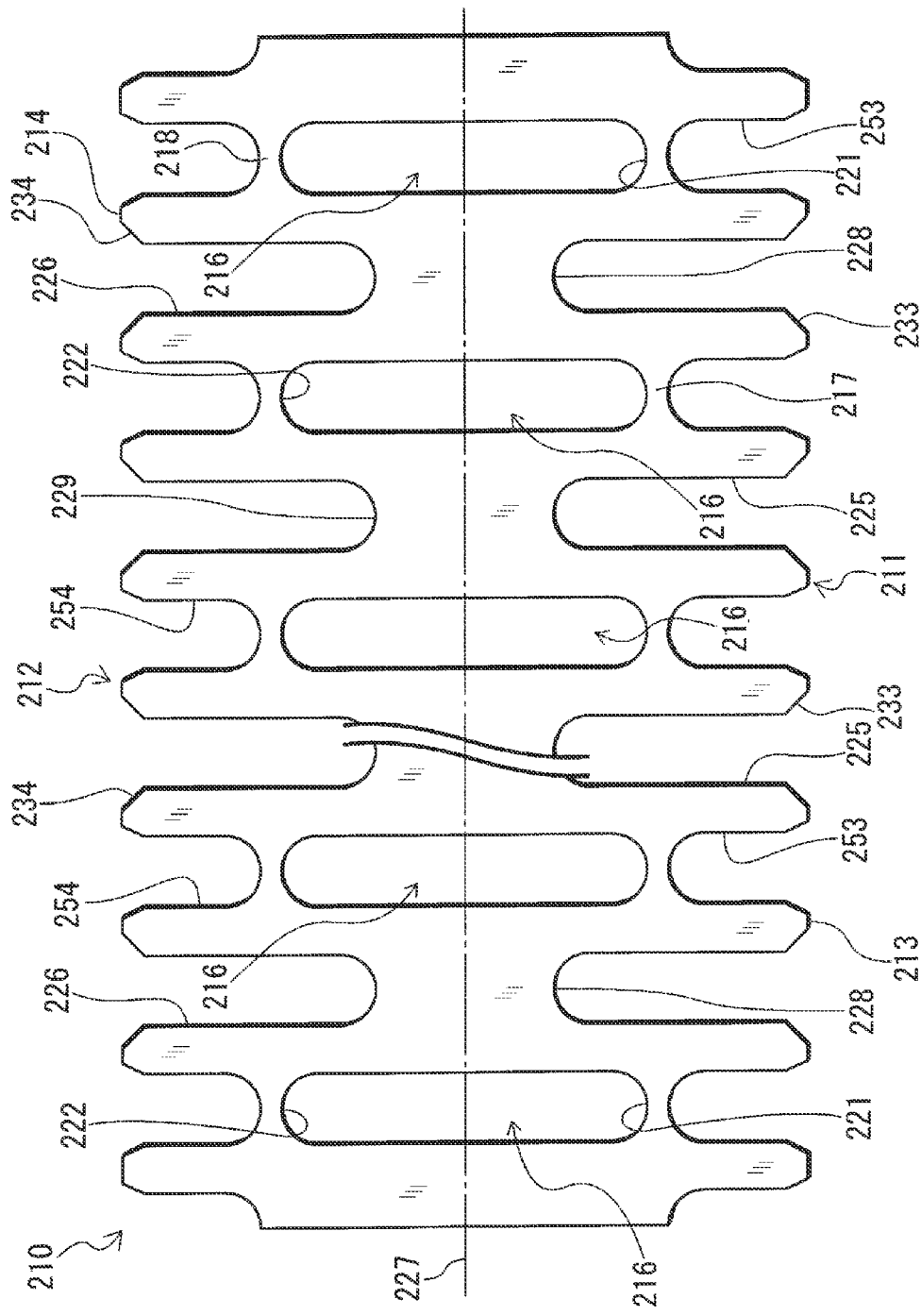
FIG. 17 is a development view showing another example of other cutaway portions in the antistatic cover of FIG. 9.
Figure 18:
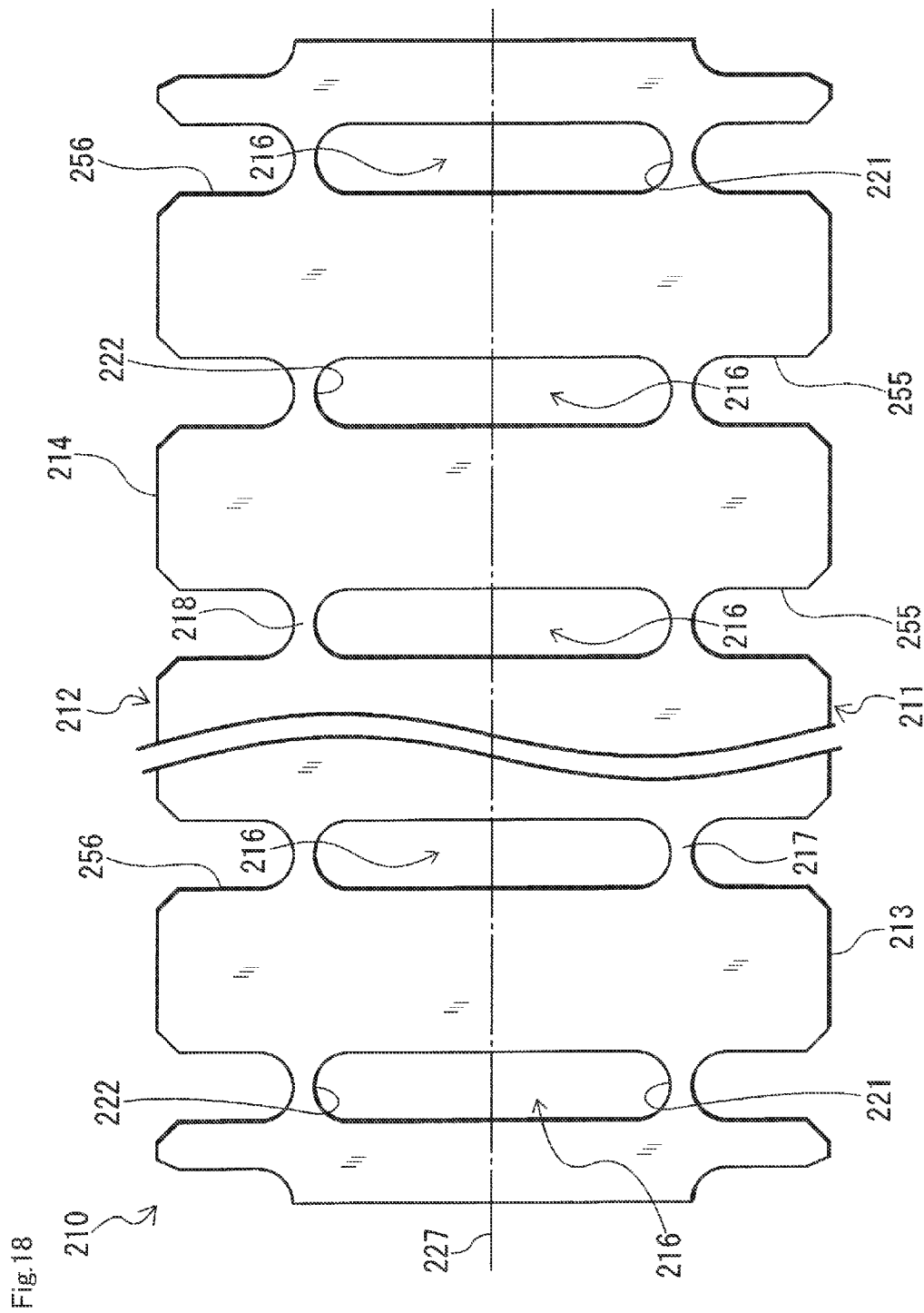
FIG. 18 is a development view showing a further example of the other cutaway portions in the antistatic cover of FIG. 9.

In the cover body 210, in addition to cutaway portions such as the (3-1)-st cutaway portions 225 and the (3-2)-nd cutaway portions 226, alternatively, (3-3)-rd cutaway portions 253 may be disposed between the adjacent (3-1)-st cutaway portions 225, 225 as shown in FIG. 17, or (3-4)-th cutaway portions 254 may be disposed between the adjacent (3-2)-nd cutaway portions 226, 226. In place of the (3-1)-st cutaway portions 225 and the (3-2)-nd cutaway portions 226, as shown in FIG. 18, (3-5)-th cutaway portions 255 and (3-6)-th cutaway portions 256 which are located on a substantially same circumference as the 2-nd cutaway portions 216 may be disposed.

Figure 19:
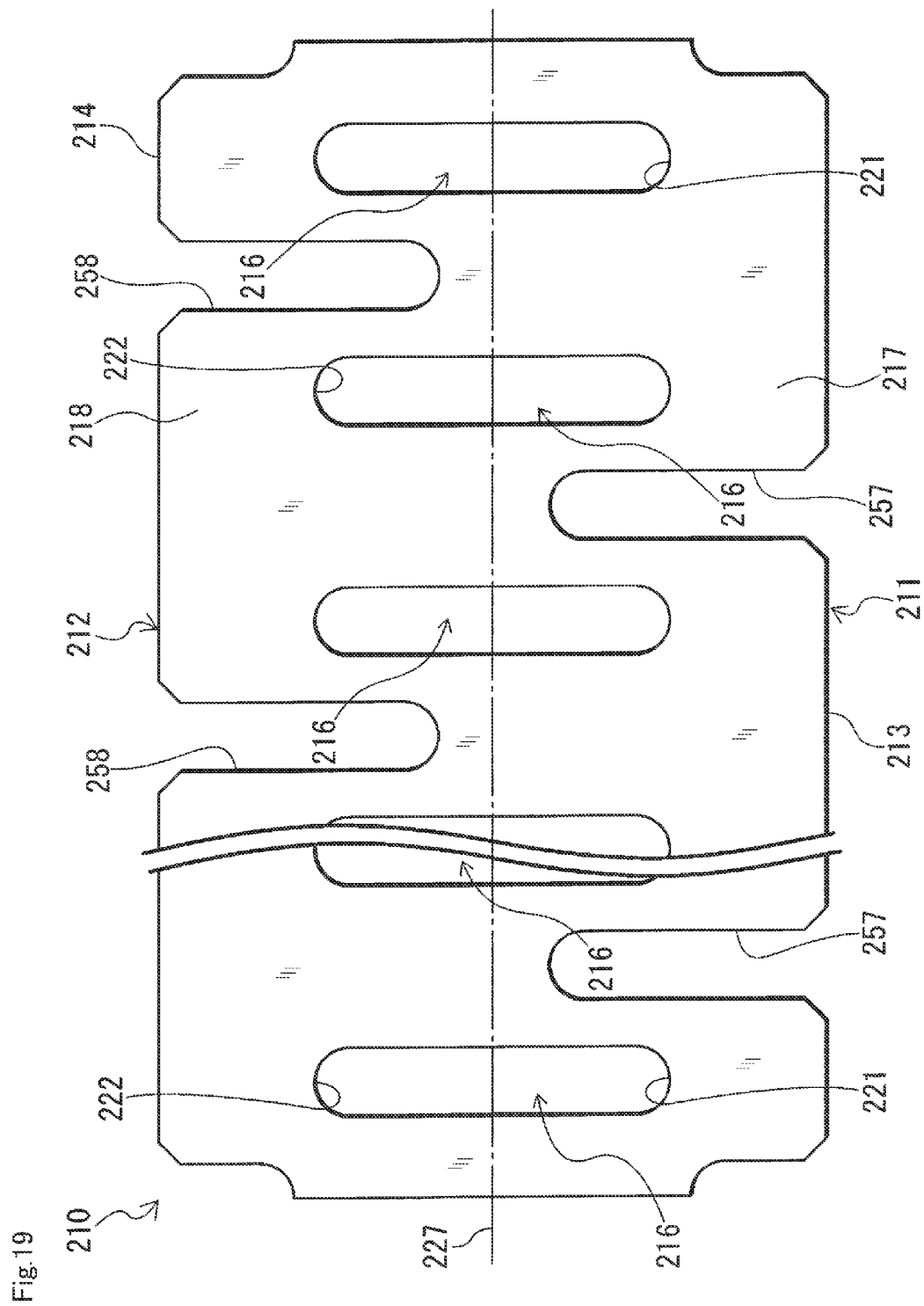
FIG. 19 is a development view showing a still further example of the other cutaway portions in the antistatic cover of FIG. 9.

In the cover body 210, in place of the (3-1)-st cutaway portions 225 and the (3-2)-nd cutaway portions 226, as shown in FIG. 19, (3-7)-th cutaway portions 257 may be disposed in the cover body 210 and on the side of the 1-st divided portion 211 so as to be asymmetric to each other about the shorter-side direction center line 227 of the cover body 210 in a development state of the antistatic cover 201, and (3-8)-th cutaway portions 258 may be disposed in the cover body 210 and on the side of the 2-nd divided portion 212.

In the embodiment, as shown in FIGS. 9 to 15, closed portions 221, 222 on the both end sides in the circumferential direction of the 2-nd cutaway portions 216 are rounded. Specifically, the closed portions 221 on the one end side in the circumferential direction of the 2-nd cutaway portions 216 are formed into a bent (arcuate) shape which is convex toward the one circumferential end surface 213 of the 1-st divided portion 211. The closed portion 222 on the other end side in the circumferential direction of the 2-nd cutaway portions 216 are formed into a bent (arcuate) shape which is convex toward the other circumferential end surface 214 of the 2-nd divided portion 212.

According to the configuration, the cover body 210 can be formed so as to be bent more easily in the axial direction without being damaged.

In the embodiment, the 2-nd cutaway portions 216 have the axial width W1 of 15 mm or less. The 2-nd cutaway portions 216 have the maximum width of 15 mm while setting the axial width W1 to be substantially constant except the closed portions 221, 222, and the minimum width at which each of the closed portions 221, 222 can be rounded. Specifically, the axial width of the 2-nd cutaway portions 216 is set in a range of 0.1 mm to 15 mm.

In the case where the axial width W1 of the 2-nd cutaway portions 216 is set to a large value in the above-described range, when the tube 202 is covered by the antistatic cover 201, the transparency or translucency of the tube 202 enables the state (for example, the flowing direction or clogging condition of the fluid) of the interior of the tube 202 to be visually checked through the 2-nd cutaway portions 216.

In the embodiment, similarly with the closed portions 221, 222 of the 2-nd cutaway portions 216, closed portions 228 on the other end side in the circumferential direction of the (3-1)-st cutaway portions 225, and closed portions 229 on the one end side in the circumferential direction of the (3-2)-nd cutaway portions 226 are rounded. A metal wire 230 such as a copper wire which is to be connected to a ground line is wound between the corresponding closed portions 228, 229 with respect to the axial direction of the cover body 210 (see FIG. 9).

In the cover body 210, alternatively, the metal wire 230 may be wound between the closed portion 221 of the 2-nd cutaway portion 216 and the closed portion 228 of the (3-1)-st cutaway portion 225, or between the closed portion 222 of the 2-nd cutaway portion 216 and the closed portion 229 of the (3-2)-nd cutaway portion 226.

In the embodiment, as shown in FIG. 12, the cover body 210 is formed into a tubular shape in the state where the 1-st divided portion 211 and the 2-nd divided portion 212 overlap with each other. In the case where the cover body 210 has the normal shape, the 2-nd divided portion 212 is placed in a radially inner side of the 1-st divided portion 211, and an overlap portion 231 where the 1-st divided portion 211 and the 2-nd divided portion 212 overlap each other is disposed in a part in the circumferential direction of the cover body 210.

Figure 16C:
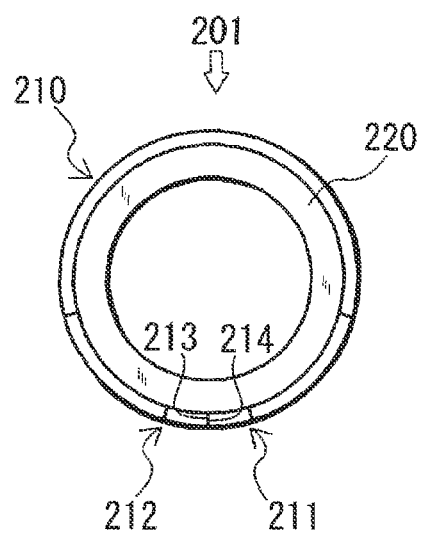
FIG. 16C is a view of a state after the antistatic cover of FIG. 9 is attached to a tube which is thicker than the tube shown in FIG. 16B.

According to the configuration, the change range of the inner diameter (diameter width on the inner circumferential side) which can be obtained in the case where the cover body 210 is to surround the tube 202 can be widened. Therefore, the antistatic cover can be used not only in attachment to or detachment from the tube 202 having an outer diameter which is approximately equal to the inner diameter of the cover body 210 in the normal shape, but also in attachment to or detachment from, in a predetermined allowable range, a thick tube 220 which is thicker than the tube 202 as shown in FIG. 16C. Namely, the antistatic cover 201 can be applied not only to one kind of tube having a predetermined outer diameter, but also to plural kinds of tubes having different outer diameters.

In the embodiment, as shown in FIGS. 11, 14, and 15, a chamfering process is applied to opening edges of the (3-1)-st cutaway portions 225 and the (3-2)-nd cutaway portions 226. Namely, chamfered portions 233 are formed in the opening edges of the (3-1)-st cutaway portions 225 which are located in the one circumferential end surface 213 of the 1-st divided portion 211, and chamfered portions 234 are formed in the opening edges of the (3-2)-nd cutaway portions 226 which are located in the other circumferential end surface 214 of the 2-nd divided portion 212.

According to the configuration, in the case where the antistatic cover 201 is attached to or detached from the tube 202, damage due to contact between the 1-st divided portion 211 and 2-nd divided portion 212 of the cover body 210, and the tube 202 is caused to hardly occur in the tube 202.

Figure 21:
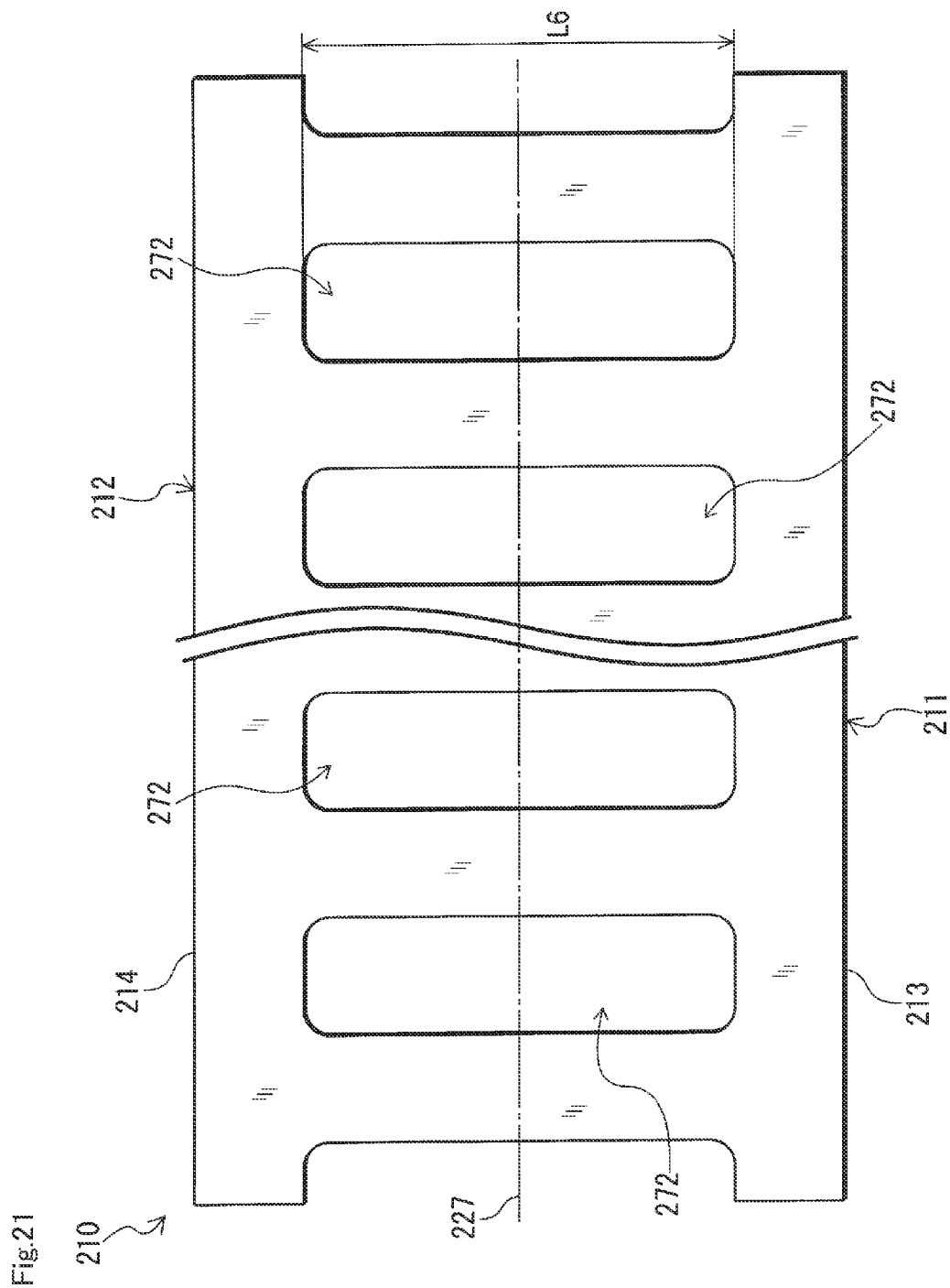
FIG. 21 is a development view of an antistatic cover of a still further embodiment of the invention.
Figure 22:
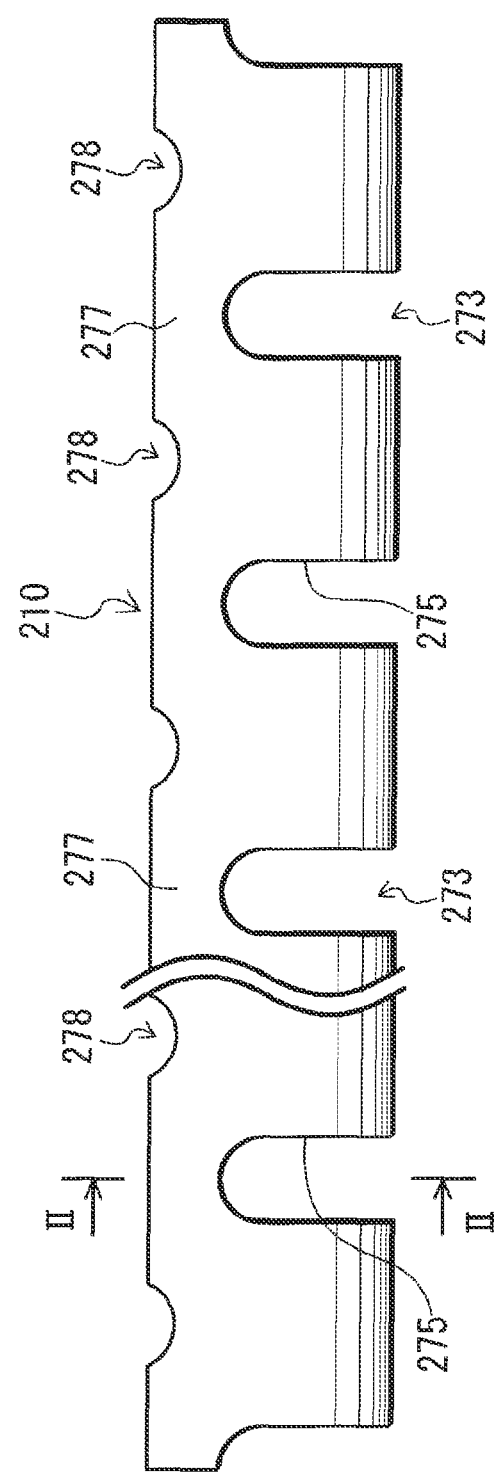
FIG. 22 is a front view of an antistatic cover of a still further embodiment of the invention.
Figure 23:
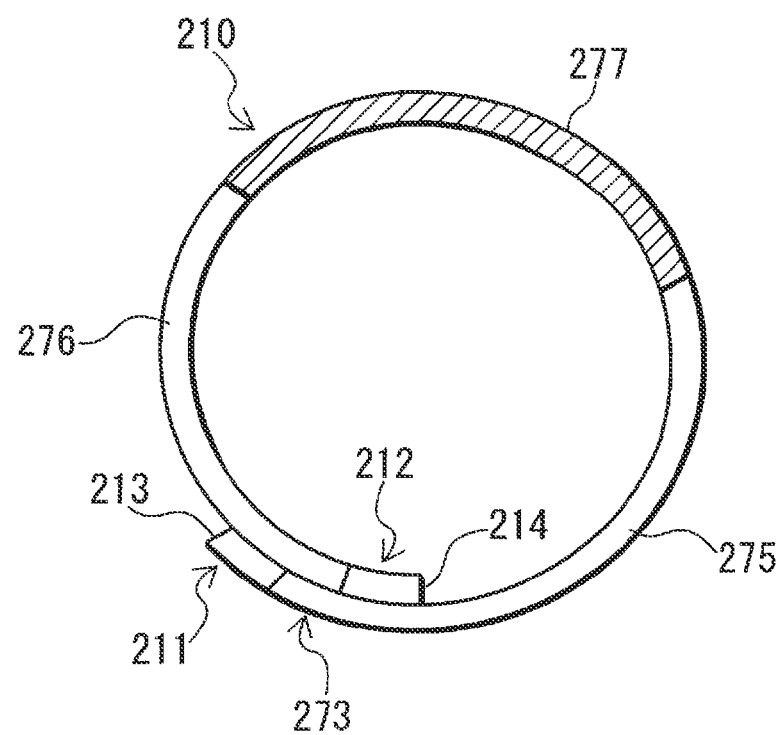
FIG. 23 is a sectional view taken along line II-II in FIG. 22.

Although, in the second embodiment, the 2-nd cutaway portions in the invention are configured by the 2-nd cutaway portions 216, the 2-nd cutaway portions are not limited to this. For example, the 2-nd cutaway portions may be sixth cutaway portions 271 (hereinafter, "sixth cutaway portion" is referred to as "6-th cutaway portion") shown in FIG. 20, seventh cutaway portions 272 (hereinafter, "seventh cutaway portion" is referred to as "7-th cutaway portion") shown in FIG. 21, or eighth cutaway portions 273 (hereinafter, "eighth cutaway portion" is referred to as "8-th cutaway portion") which are configured by a plurality of cutaway portions placed on a substantially same circumference as shown in FIGS. 22 and 23. In the figures, components which are substantially identical with those of the second embodiment are denoted by the same reference numerals.

Figure 20:
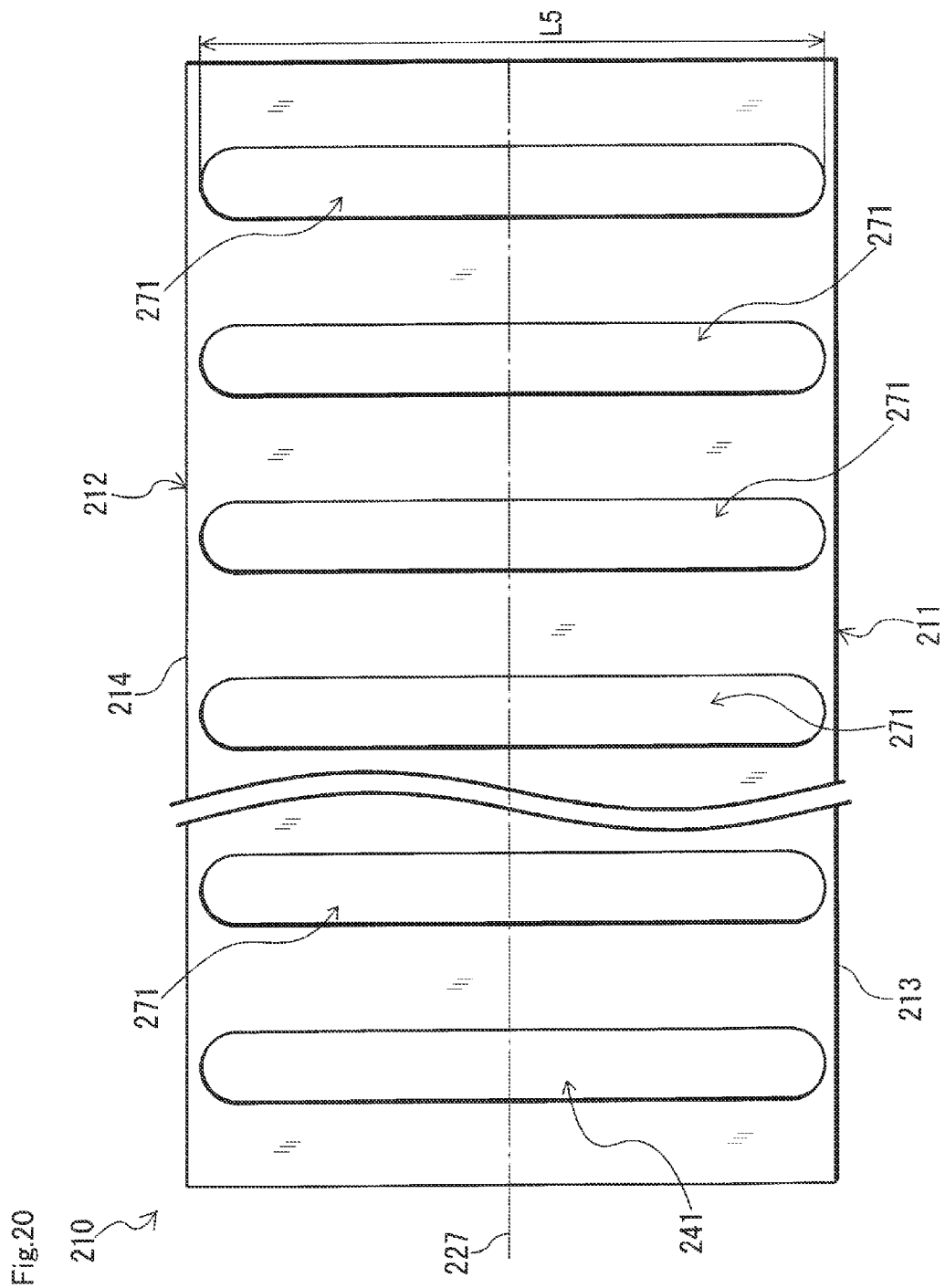
FIG. 20 is a development view of an antistatic cover of a further embodiment of the invention.

As shown in FIG. 20, the cutaway portion in the invention may be the long-hole-like 6-th cutaway portions 271 having a length L5 which is larger than the length L2 in the above-described embodiment, with respect to the length L1 of one circumference of the cover body 210, in the circumferential direction of the cover body 210. As shown in FIG. 21, alternatively, the cutaway portion in the invention may be the rectangular 7-th cutaway portions 272 that have a length L6 which is 40% or more of the length L1 of one circumference of the cover body 210, in the circumferential direction of the cover body 210, and in which the longitudinal direction coincides with the circumferential direction of the cover body 210, and each corner is rounded.

Figure 24:
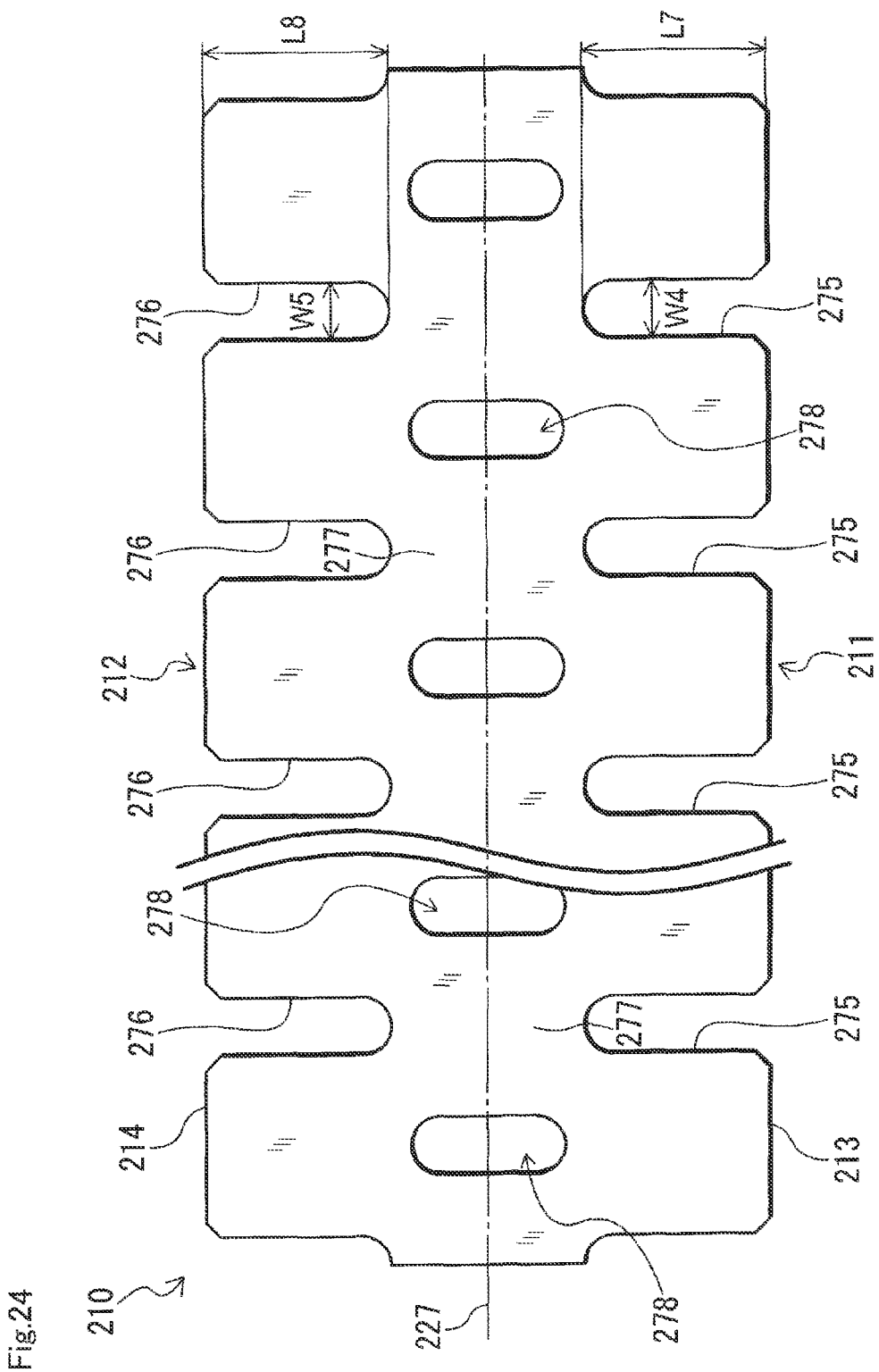
FIG. 24 is a development view of the antistatic cover of FIG. 22.

As shown in FIGS. 22 to 24, alternatively, the cutaway portion in the invention may be the 8-th cutaway portions 273 which are configured by (8-1)-st cutaway portions 275 disposed in the 1-st divided portion 211, and (8-2)-nd cutaway portions 276 disposed in the 2-nd divided portion 212. In this case, the (8-1)-st cutaway portions 275 and the (8-2)-nd cutaway portions 276 are placed on a substantially same straight line in the circumferential direction of the cover body 210. The (8-1)-st cutaway portions 275 have an axial width W4, and the (8-2)-nd cutaway portions 276 have an axial width W5 which is approximately equal to the axial width W4.

In the circumferential direction of the cover body 210, the length of the 8-th cutaway portions 273, i.e., the length (L7+L8) which is the sum of the length L7 of the (8-1)-st cutaway portions 275 and the length L8 of the (8-2)-nd cutaway portions 276 is set to be 40% or more of the length L1 of one circumference of the cover body 210. Small-width portions 277 of the 8-th cutaway portions 273 have a size by which, even when the cover body 210 is bent in the axial direction, the coupling between regions that are in the cover body 210, and that are respectively on the both axial sides across the 8-th cutaway portions 273 in the cover body 210 is maintained.

In this case, as shown in FIGS. 22 and 24, at least one other cutaway portion 278 which is configured by a through hole passing through the cover body 210 may be disposed as a cutaway portion (corresponding to the other 3-rd cutaway portion) other than the 8-th cutaway portions 273 (above-described (8-1)-st cutaway portions 275 and (8-2)-nd cutaway portions 276). According to the configuration, in the case where the cover body 210 surrounds a tube, when the tube is transparent or translucent, the state in the tube 202 can be visually checked through the 8-th cutaway portions 273 and the other cutaway portion 278.

In the above-described embodiments, the content rate of the conductive material in the resin composition forming the cover body 210 is set to fall preferably from 1% to 20%, more preferably from 5% to 20%, and further preferably from 5% to 15% from the viewpoints of the electrical charge preventing performance which is obtained when the cover body 210 covers the tube 202, and the attachability/detachability of the cover body 210 to and from the tube 202, repeatability of attachment and detachment, and fittability.

Next, a third embodiment of the invention will be described with reference to the drawings.

Figure 25:
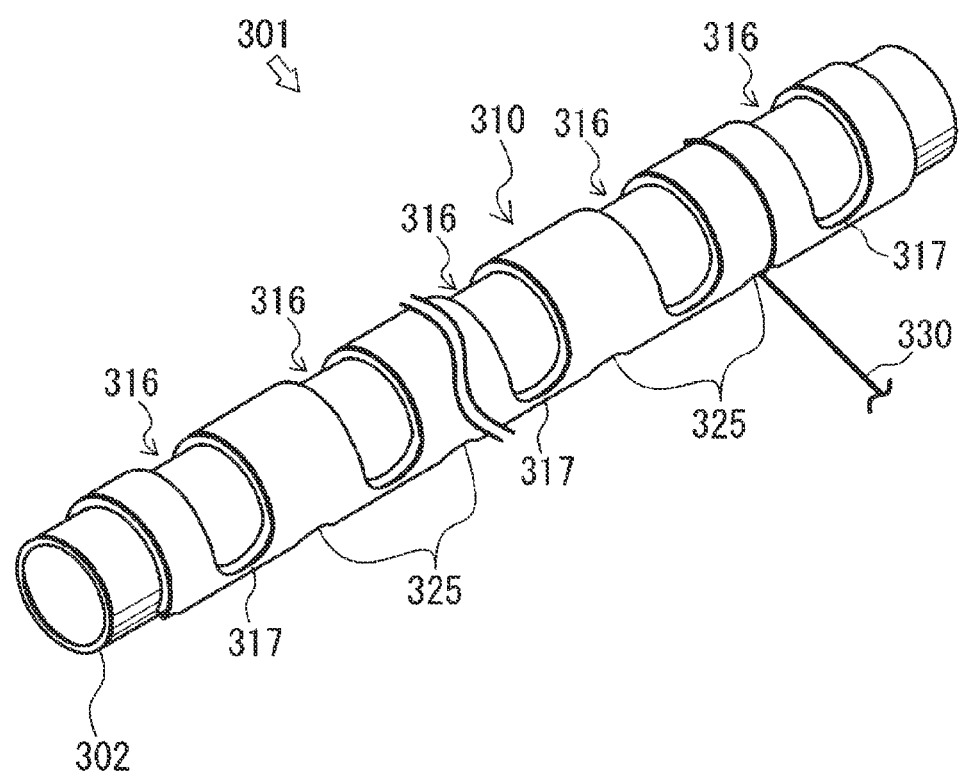
FIG. 25 is a perspective view showing a use state of an antistatic cover of a third embodiment of the invention.

FIG. 25 shows a use state of an antistatic cover 301 of the third embodiment of the invention.

As shown in FIG. 25, for example, the antistatic cover 301 can be used on an existing tube 302 which has been disposed to allow a combustible fluid (electrically insulating fluid) such as an organic solvent to flow therethrough in an apparatus for producing a semiconductor, liquid crystal, an organic EL. The antistatic cover 301 can be fitted onto a part of the tube 302 so as to cover a part of the tube 302, and is formed as a whole so as to have a cutaway tubular shape in conformity with the tube 302.

The tube 302 is an insulating resin-made tube. In the embodiment, the tube is made of a fluororesin such as PFA (perfluoro alkoxyalkane). The tube 302 is transparent or translucent to allow the interior to be visible from the outside, formed into a cylindrical shape having a substantially constant diameter, and configured so that both end portions in the axial direction can be connected to predetermined devices (connection targets) of the production apparatus, respectively.

Figure 26:
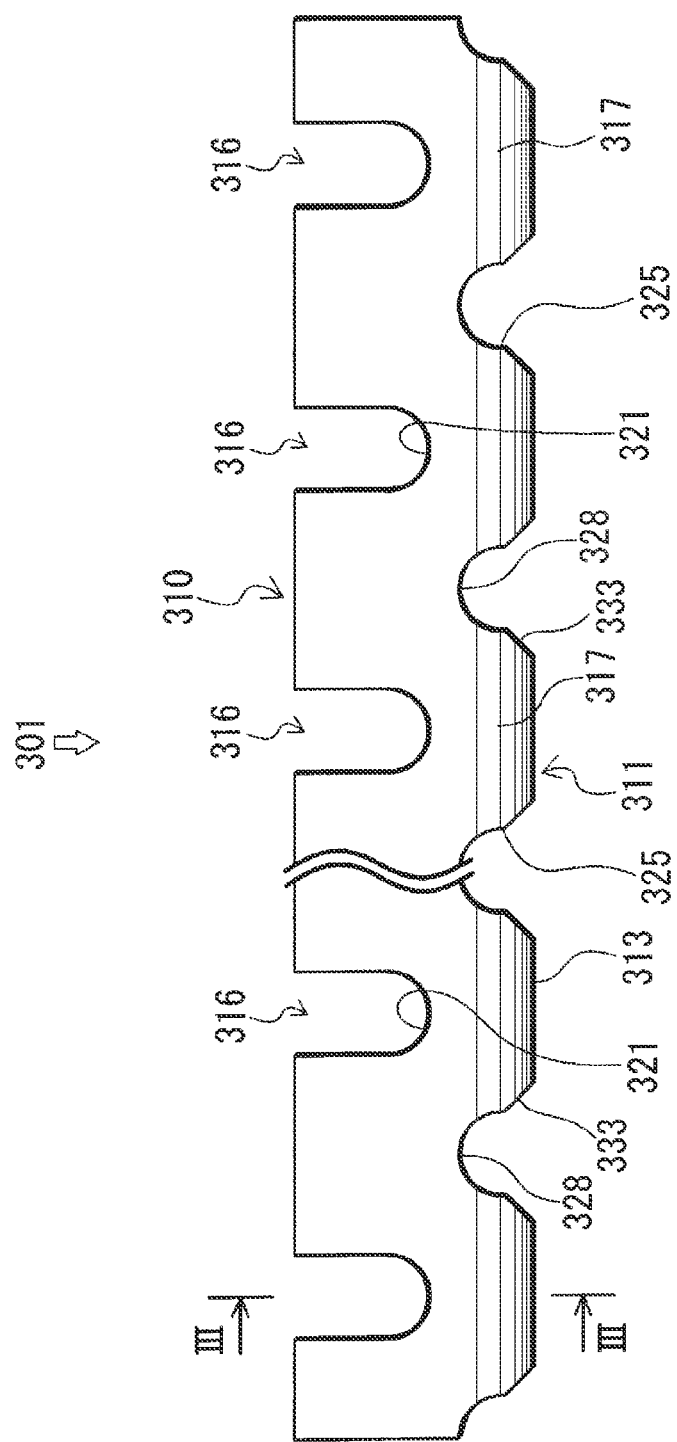
FIG. 26 is a front view of the antistatic cover of FIG. 25.
Figure 27:
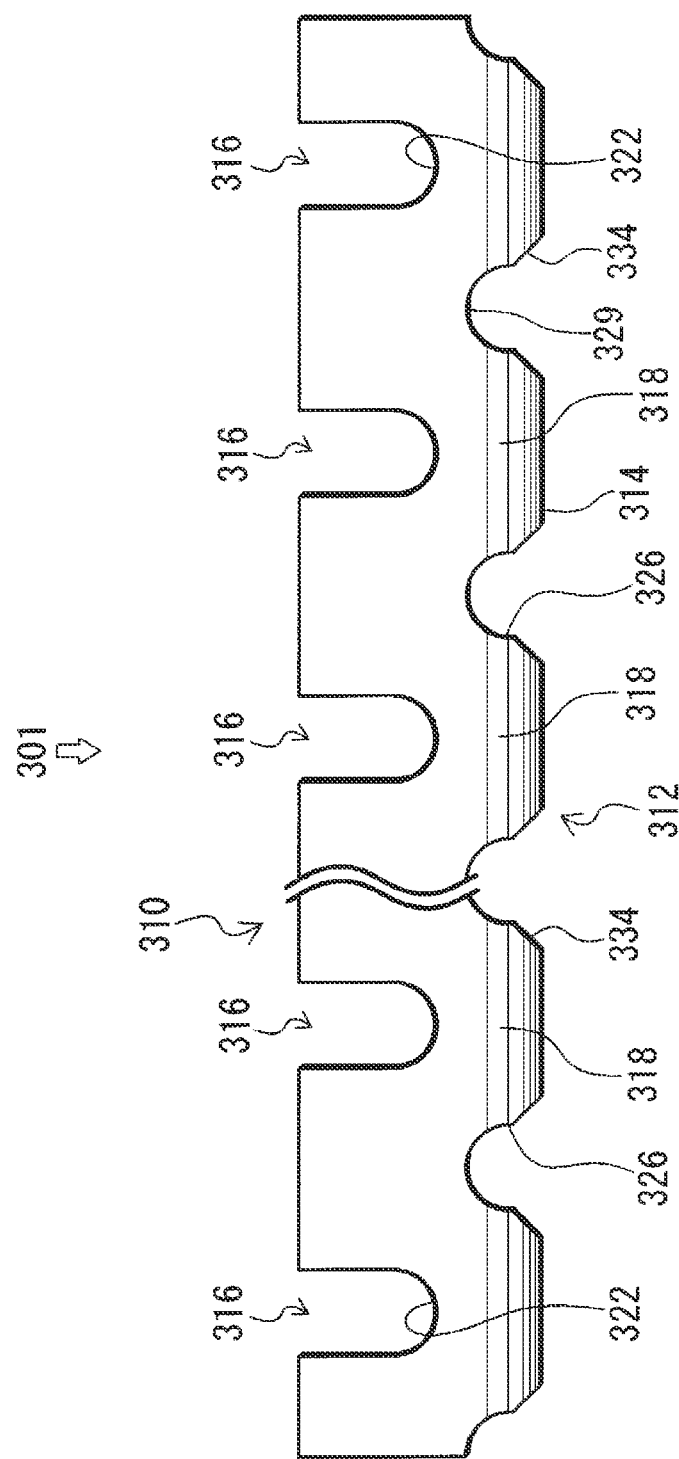
FIG. 27 is a back view of the antistatic cover of FIG. 25.
Figure 28A:
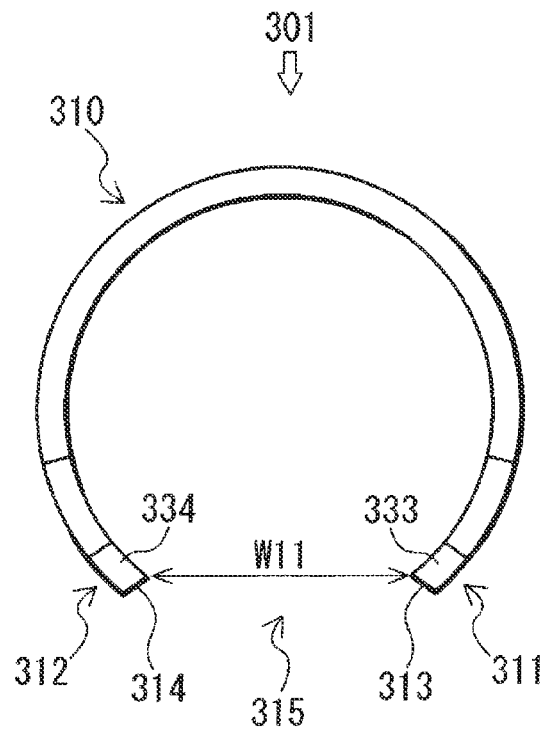
FIG. 28A is a side view of the antistatic cover of FIG. 25.
Figure 28B:
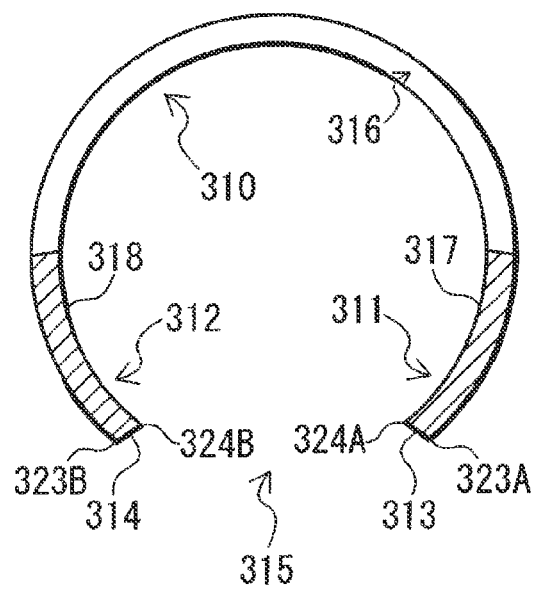
FIG. 28B is a sectional view taken along line III-III in FIG. 26.
Figure 30:
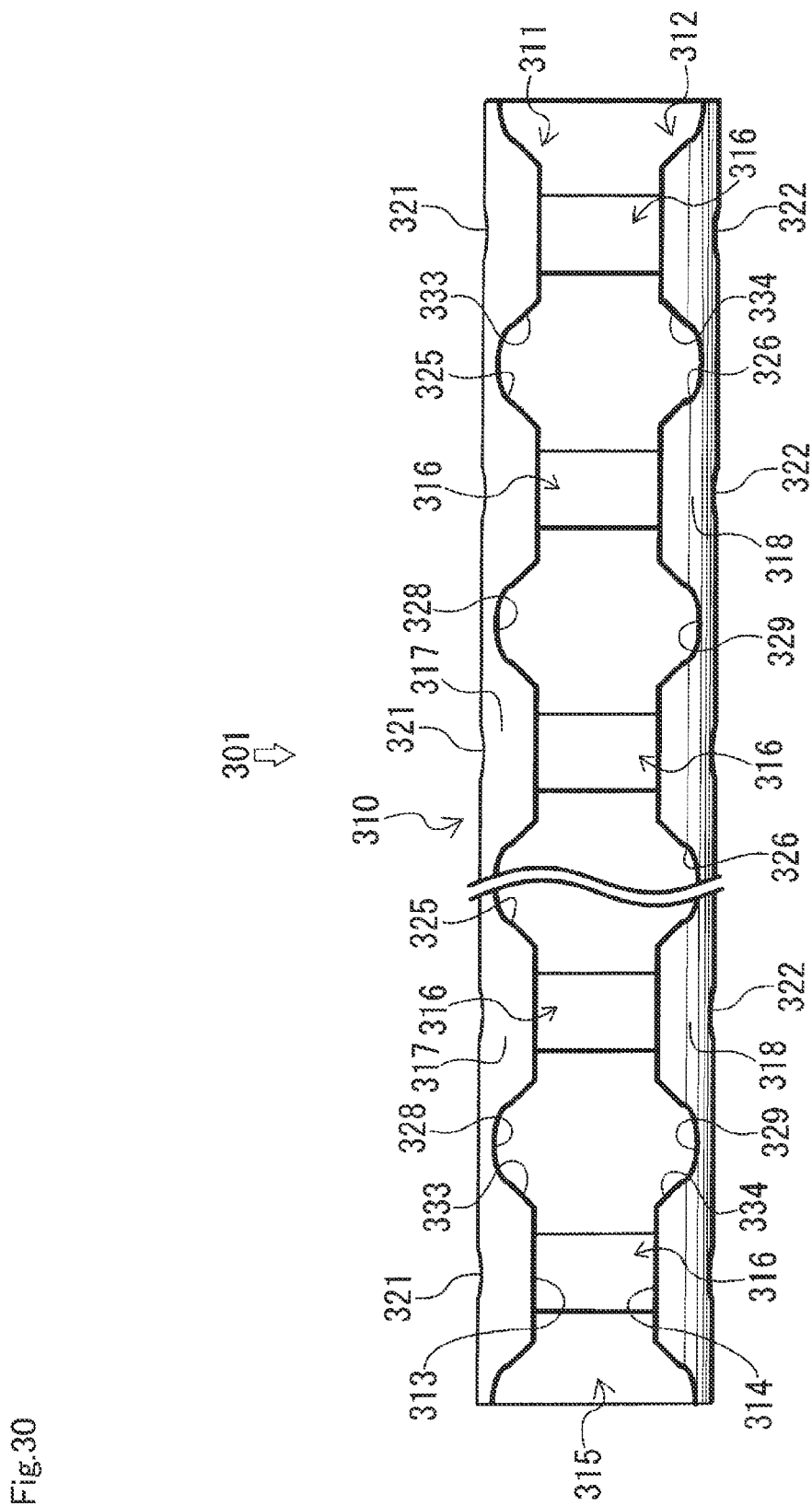
FIG. 30 is a bottom view of the antistatic cover of FIG. 25.
Figure 31:
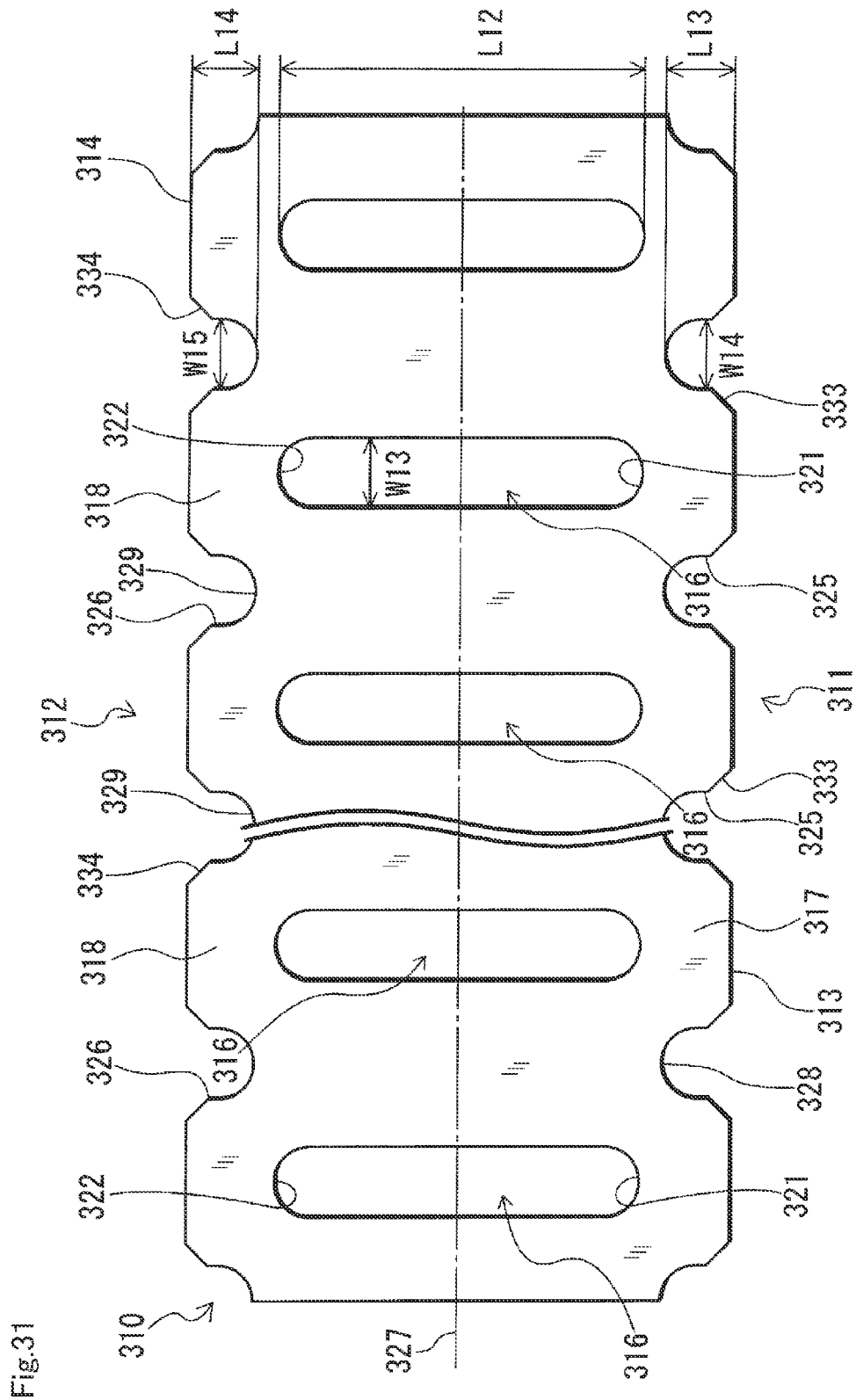
FIG. 31 is a development view of the antistatic cover of FIG. 25.
Figure 32A:
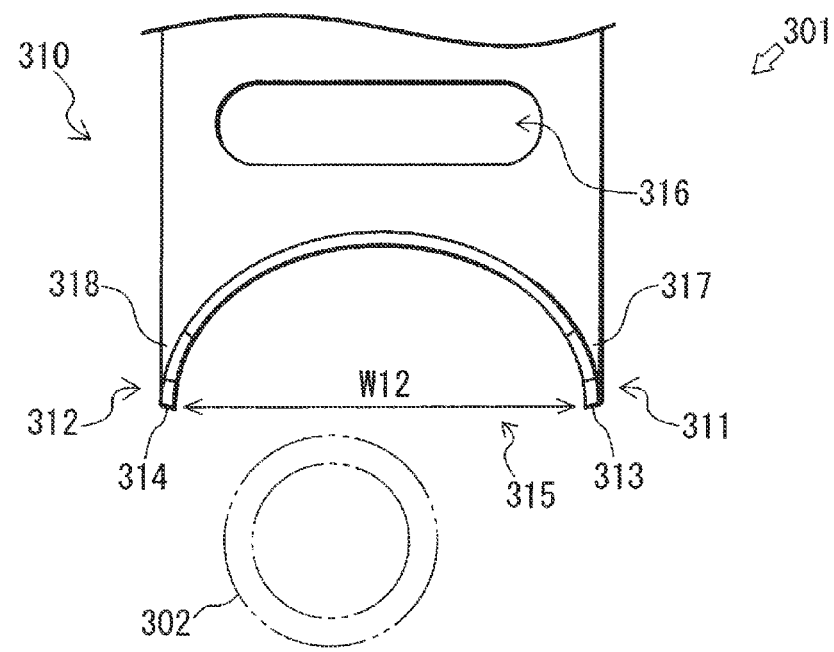
FIG. 32A is a view of a state immediately before attachment of the antistatic cover of FIG. 25 to a tube.
Figure 32B:
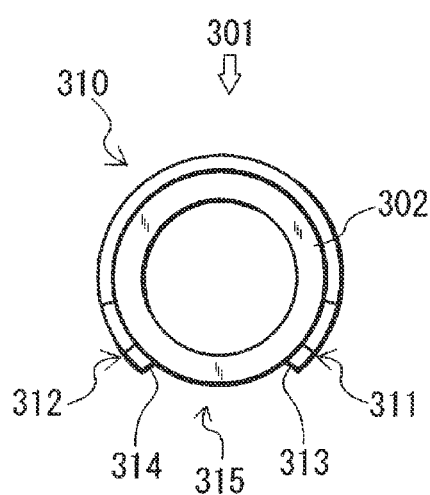
FIG. 32B is a view of a state after attachment of the antistatic cover of FIG. 25 to the tube.

FIG. 26 is a front view of the antistatic cover 301, FIG. 27 is a back view of the antistatic cover 301, FIGS. 28A and 28B are side and side sectional views of the antistatic cover 301, FIG. 29 is a plan view of the antistatic cover 301, FIG. 30 is a bottom view of the antistatic cover 301, FIG. 31 is a development view of the antistatic cover 301, and FIGS. 32A and 32B are side views showing a manner of attachment of the antistatic cover 301 to the tube 302.

As shown in FIGS. 25 to 31, the antistatic cover 301 includes the cover body 310. The cover body 310 is configured by a resin composition containing a conductive material. In the embodiment, the cover body 310 is configured by PP (polypropylene) containing carbon black.

In the invention, the resin composition containing a conductive material is not limited to PP containing carbon black used in the embodiment, and may be a resin composition such as PP or PE (polyethylene) containing a conductive material such as carbon fibers, graphite, fine metal powder, or a combination of two or more of these materials.

As shown in FIGS. 28A and 28B, the cover body 310 is formed into a tubular shape (in the embodiment, a cylindrical shape) which is partly cut away in the circumferential direction so as to form one and other circumferential end portions 311, 312 which have a gap 315 of a predetermined interval W11 therebetween. As shown in FIGS. 32A and 32B, the cover body 310 is configured so as to be elastically deformable in a manner that the cover body can be fitted onto the tube 302 while the tube passes through the gap 315.

In the embodiment, one circumferential end surface 313 which extends in the axial direction of the cover body 310 is disposed in the one circumferential end portion 311. The one circumferential end surface 313 is formed into a planar shape which extends along the axis of the cover body 310, and which tolerates a certain level of convexes and concaves. By contrast, the other circumferential end surface 314 which extends in the axial direction of the cover body 310 is disposed in the other circumferential end portion 312. The other circumferential end surface 314 is formed into a planar shape which extends along the axis of the cover body 310, and which tolerates a certain level of convexes and concaves.

The cover body 310 is configured so as to, by using elastic deformation, be able to have a predetermined shape by changing the gap 315 between the one circumferential end portion 311 and the other circumferential end portion 312, from the predetermined interval W11 to an interval W12 which is larger than the predetermined interval.

Specifically, the cover body 310 is configured so as to be able to have a normal shape in which, as shown in FIG. 28A, the gap 315 between the one circumferential end portion 311 and the other circumferential end portion 312 is formed with the predetermined interval W11. The normal shape is a shape which is attained during a period when the cover body 310 is not fitted onto the tube 302, or the antistatic cover 301 is not used.

In the normal shape, the cover body 310 is in a natural state, and configured so that the length of one circumference is L11. The length L11 is defined by the following expression:

$$\text{Length } L11 = (L11a + L11b) \times \tfrac{1}{2}$$

where L11a indicates the circumferential length which, on the outer circumferential surface of the cover body 310, extends from the start position 323A of the one circumferential end surface 313 to the end position 323B of the other circumferential end surface 314 (see FIG. 28B), and L11b indicates the circumferential length which, on the inner circumferential surface of the cover body 310, extends from the start position 324A of the one circumferential end surface 313 to the end position 324B of the other circumferential end surface 314 (see FIG. 28B).

The cover body 310 is configured so as to be able to have a deformed shape where, as shown in FIG. 32A, the gap 315 is formed with an interval (interval W12) which is larger than the predetermined interval W11, between the one circumferential end portion 311 and the other circumferential end portion 312. The deformed shape is a temporary shape which is formed in the case where the cover body 310 is to be attached to or detached from the tube 302.

The cover body 310 is configured so as to be able to have a covering shape where, as shown in FIG. 32B, the gap 315 is formed with an interval corresponding to the tube 302, between the one circumferential end portion 311 and the other circumferential end portion 312. The covering shape is a shape which is attained during a period when the antistatic cover 301 is held to a state where the cover body 310 is fitted onto the tube 302, or the antistatic cover 301 is used.

According to the configuration, the antistatic cover 301 can be attached to and detached from the tube 302. In the case where the antistatic cover 301 is to be attached to the tube 302, firstly, an external force for deforming the cover body 310 is applied to the antistatic cover 301. This causes the antistatic cover 301 to be changed from the normal shape to the deformed shape, thereby widening the gap 315 to the interval W12.

Then, the tube 302 is moved from the gap 315 toward the interior of the cover body 310. After the movement, the cover body 310 is elastically deformed so as to be fitted onto the tube 302. As shown in FIGS. 25 and 32B, as a result, the cover body 310 is changed to the covering shape, and the work of attaching the antistatic cover 301 can be completed.

In the case where the antistatic cover 301 is to be detached from the tube 302, by contrast, an external force for deforming the cover body 310 is applied to the antistatic cover 301. Then, the antistatic cover 301 is changed from the covering shape to the deformed shape, and the tube 302 is moved from the gap 315 toward the outside of the cover body 310. As shown in FIG. 28A, as a result, the antistatic cover 301 can be returned to the normal shape, and the work of detaching the antistatic cover 301 can be completed.

In the antistatic cover 301, as shown in FIGS. 25 to 31, the cover body 310 has 4-th cutaway portions 316. The 4-th cutaway portions 316 are disposed along the circumferential direction of the cover body 310 between the one circumferential end portion 311 and the other circumferential end portion 312 of the cover body 310. The 4-th cutaway portions 316 have a length L12 which is 40% or more of the above-described length L11 of the one circumference of the cover body 310, in the circumferential direction of the cover body 310.

In the embodiment, each of the 4-th cutaway portions 316 is configured by one long-hole-like through hole which passes through the cover body 310 in a radial direction of the body. The 4-th cutaway portions 316 have a predetermined axial width W13, and are disposed inside peripheral edge portions of the cover body 310.

In the cover body 310, 3-rd small-width portions 317 are formed between the 4-th cutaway portions 316 and the one circumferential end surface 313 of the one circumferential end portion 311. In the cover body 310, moreover, 4-th small-width portions 318 are formed between the 4-th cutaway portions 316 and the other circumferential end surface 314 of the other circumferential end portion 312.

The 3-rd small-width portions 317 and the 4-th small-width portions 318 have a circumferential length by which, even when the cover body 310 is bent in the axial direction, the coupling between regions that are in the cover body 310, and that are respectively on the both axial sides across the 4-th cutaway portions 316 is maintained in the circumferential direction of the cover body 310 (for example, the length is equivalent to, two times, or five times the thickness of the cover body 310).

Preferably, the radial depth of the 4-th cutaway portions 416, i.e., the thickness of the cover body 310 is set to a predetermined value which is in a range of 0.5 mm to 2 mm or less.

According to the configuration, when the antistatic cover 301 is to be applied to the existing tube 302, the cover body 310 can be fitted onto the tube 302, and hence it is possible to block the tube 302 from being electrically charged, by using the antistatic cover 301. Namely, the tube 302 can be provided with the electrical charge preventing performance by using the antistatic cover 301.

When the antistatic cover 301 is to be attached to or detached from the tube 302, the cover body 310 is deformed so as to widen the gap 315, and can be overlaid on or detached from the tube 302 from the side of one of them. Even when the tube 302 has been connected to predetermined connection targets, therefore, the antistatic cover 301 can be easily attached to or detached from the tube 302.

In the cover body 310, moreover, the 3-rd small-width portions 317 and the 4-th small-width portions 318 can be formed by the 4-th cutaway portions 316, and hence the cover body 310 can be formed so as to be easily bent in the axial direction. Even in the case where the tube 302 is disposed in a state where it has been bent in the axial direction, therefore, the cover body 310 can be easily bent in conformity with the tube 302 in the bent state. Consequently, attachment and detachment of the antistatic cover 301 to and from the tube 302 can be facilitated.

In the embodiment, as shown in FIGS. 25 to 31, the plurality of 4-th cutaway portions 316 are disposed in the axial direction of the cover body 310. The plurality of 4-th cutaway portions 316 are placed at regular intervals in the area extending from one end side of the axial direction of the cover body 310 to the other end side. The intervals between the adjacent 4-th cutaway portions 316, 316 are matched so as to be substantially equal to one another.

According to the configuration, the cover body 310 can be formed so as to be bent more easily in the axial direction.

Figure 32C:
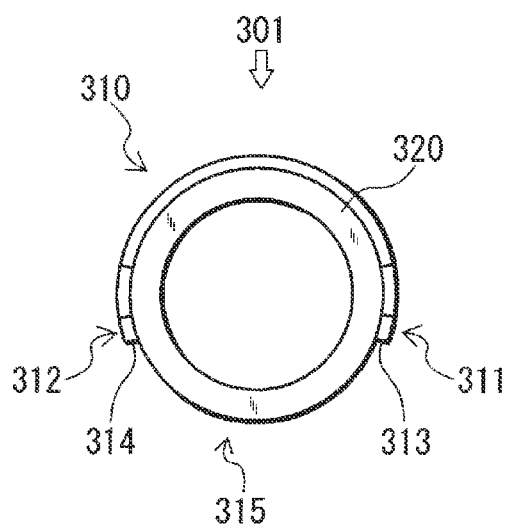
FIG. 32C is a view of a state after the antistatic cover of FIG. 25 is attached to a tube which is thicker than the tube shown in FIG. 32B.

The cover body 310 can be used not only in attachment to or detachment from the tube 302, but also in attachment to or detachment from, in a predetermined allowable range, a tube 320 which is thicker than the tube 302 as shown in FIG. 32C. Namely, the antistatic cover 301 can be applied not only to one kind of tube having a predetermined outer diameter, but also to plural kinds of tubes having different outer diameters.

In the embodiment, as shown in FIGS. 26, 27, 30, and 31, the cover body 310 has at least one 5-th cutaway portion which is different from the 4-th cutaway portions 316. The 5-th cutaway portion is placed in at least one of the one circumferential end portion 311 and the other circumferential end portion 312, and between the adjacent 4-th cutaway portions 316, 316.

Specifically, the 5-th cutaway portion includes a plurality of (5-1)-st cutaway portions 325 in the one circumferential end portion 311, and a plurality of (5-2)-nd cutaway portions 326 in the other circumferential end portion 312. The (5-1)-st cutaway portions 325 and the (5-2)-nd cutaway portions 326 have lengths L13, L14 in the circumferential direction of the cover body 310, respectively, and placed alternately at regular intervals so as to overlap or not to overlap (in the embodiment, so as not to overlap) the 4-th cutaway portions 316, in the axial direction of the cover body 310.

The (5-1)-st cutaway portions 325 are recesses which are formed by cutting away the cover body 310 so as to pass through the cover body in a radial direction, and extend from the one circumferential end surface 313 of the one circumferential end portion 311 toward a middle portion in the circumferential direction of the cover body 310. The (5-1)-st cutaway portions 325 have an approximately constant axial width W14 which is approximately equal to or larger than the axial width of the 4-th cutaway portions 316 (in the embodiment, approximately equal to the width).

The (5-2)-nd cutaway portions 326 are recesses which are formed by cutting away the cover body 310 so as to pass through the cover body in a radial direction, and extend from the other circumferential end surface 314 of the other circumferential end portion 312 toward a middle portion in the circumferential direction of the cover body 310. The (5-2)-nd cutaway portions 326 have an approximately constant axial width W15 which is approximately equal to or larger than the axial width of the 4-th cutaway portions 316 (in the embodiment, approximately equal to the width).

The (5-2)-nd cutaway portions 326 are disposed in the same number as the (5-1)-st cutaway portions 325. As shown in FIG. 31, the (5-2)-nd cutaway portions 326 are placed symmetrically with the (5-1)-st cutaway portions 325 about the shorter-side direction center line 327 of the cover body 310 in a development state of the antistatic cover 301, and cooperate with the (5-1)-st cutaway portions 325 which are continuous to the cutaway portions in the case where the cover body 310 has the normal shape or the covering shape, to make it possible to form through holes.

According to the configuration, the cover body 310 can be more easily bent in the axial direction while sufficiently ensuring the electrical charge preventing performance that is provided to the tube 302 by the antistatic cover 301. In the case where the cover body 310 is fitted onto the tube 302, when the tube 302 is transparent or translucent, the state in the tube 302 can be visually checked through the 5-th cutaway portions (above-described (5-1)-st cutaway portions 325 and (5-2)-nd cutaway portions 326).

Figure 33:
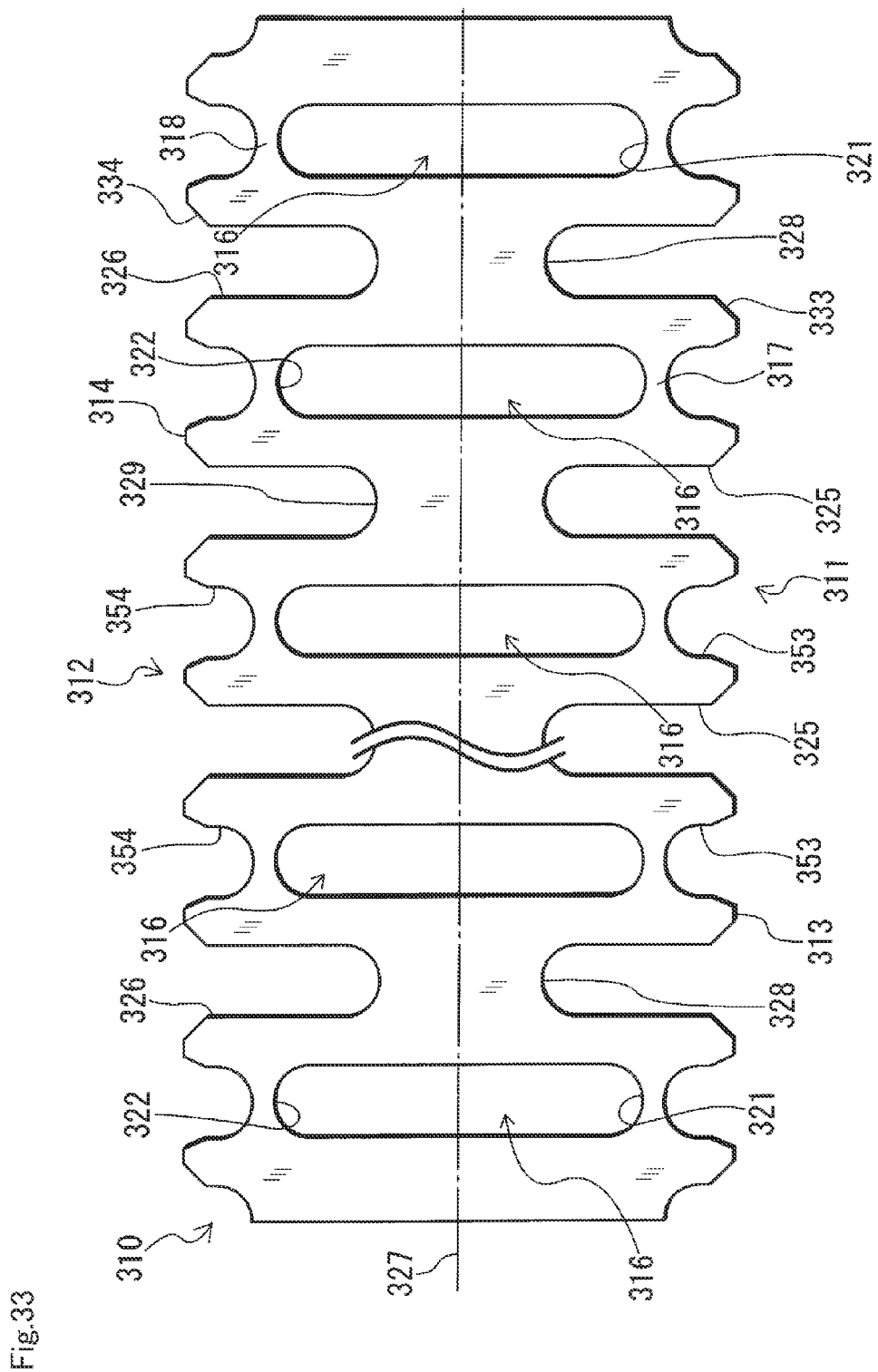
FIG. 33 is a development view showing another example of other cutaway portions in the antistatic cover of FIG. 25.
Figure 34:
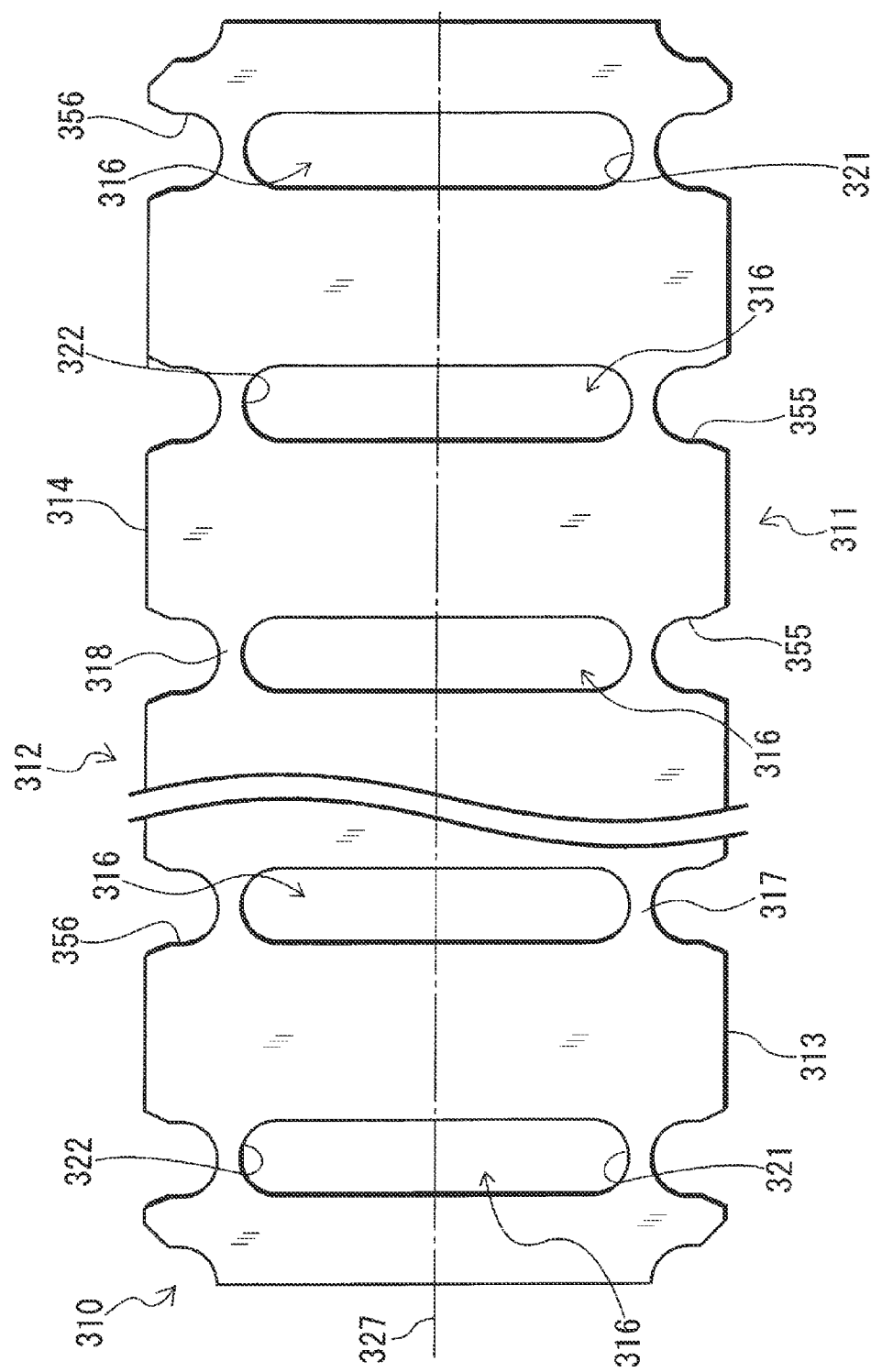
FIG. 34 is a development view showing a further example of the other cutaway portions in the antistatic cover of FIG. 25.

In the cover body 310, in addition to cutaway portions such as the (5-1)-st cutaway portions 325 and the (5-2)-nd cutaway portions 326, alternatively, (5-3)-rd cutaway portions 353 may be disposed between the adjacent (5-1)-st cutaway portions 325, 325 as shown in FIG. 33, or (5-4)-th cutaway portions 354 may be disposed between the adjacent (5-2)-nd cutaway portions 326, 326. In place of the (5-1)-st cutaway portions 325 and the (5-2)-nd cutaway portions 326, as shown in FIG. 34, (5-5)-th cutaway portions 355 and (5-6)-th cutaway portions 356 which are located on a substantially same circumference as the 4-th cutaway portions 316 may be disposed.

Figure 35:
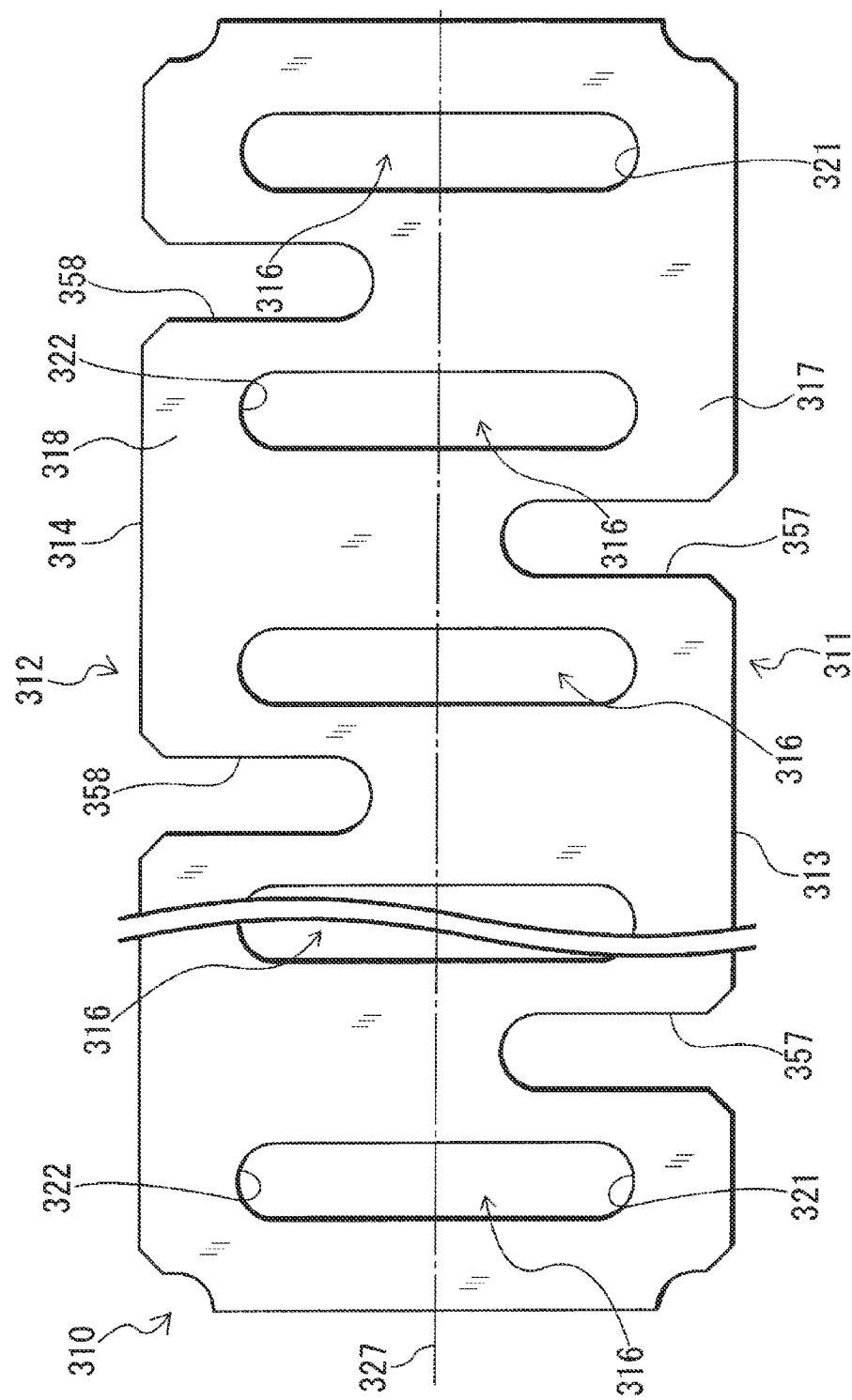
FIG. 35 is a development view showing a still further example of the other cutaway portions in the antistatic cover of FIG. 25.

In the cover body 310, in place of the (5-1)-st cutaway portions 325 and the (5-2)-nd cutaway portions 326, as shown in FIG. 35, (5-7)-th cutaway portions 357 may be disposed in the cover body 310 and on the side of the one circumferential end portion 311 so as to be asymmetric to each other about the shorter-side direction center line 327 of the cover body 310 in a development state of the antistatic cover 301, and (5-8)-th cutaway portions 358 may be disposed in the cover body 310 and on the side of the other circumferential end portion 312.

In the embodiment, as shown in FIGS. 25 to 31, closed portions 321, 322 on the both end sides in the circumferential direction of the 4-th cutaway portions 316 are rounded. Specifically, the closed portions 321 on the one end side in the circumferential direction of the 4-th cutaway portions 316 are formed into a bent (arcuate) shape which is convex toward the one circumferential end surface 313 of the one circumferential end portion 311. The closed portion 322 on the other end side in the circumferential direction of the 4-th cutaway portions 316 are formed into a bent (arcuate) shape which is convex toward the other circumferential end surface 314 of the other circumferential end portion 312.

According to the configuration, the cover body 310 can be formed so as to be bent more easily in the axial direction without being damaged.

In the embodiment, the 4-th cutaway portions 316 have the axial width W13 of 15 mm or less. The 4-th cutaway portions 316 have the maximum width of 15 mm while setting the axial width W13 to be substantially constant except the closed portions 321, 322, and the minimum width at which each of the closed portions 321, 322 can be rounded. Specifically, the axial width of the 4-th cutaway portions 316 is set in a range of 0.1 mm to 15 mm or less.

In the case where the axial width of the 4-th cutaway portions 316 is set to a large value in the above-described range, when the tube 302 is covered by the antistatic cover 301, the transparency or translucency of the tube 302 enables the state (for example, the flowing direction or clogging condition of the fluid) of the interior of the tube 302 to be visually checked through the 4-th cutaway portions 316.

In the embodiment, similarly with the closed portions 321, 322 of the 4-th cutaway portions 316, closed portions 328 on the other end side in the circumferential direction of the (5-1)-st cutaway portions 325, and closed portions 329 on the one end side in the circumferential direction of the (5-2)-nd cutaway portions 326 are rounded. A metal wire 330 such as a copper wire which is to be connected to a ground line is wound between the corresponding closed portions 328, 329 with respect to the axial direction of the cover body 310 (see FIG. 25).

In the cover body 310, alternatively, the metal wire 330 may be wound between the closed portion 321 of the 4-th cutaway portion 316 and the closed portion 328 of the (5-1)-st cutaway portion 325, or between the closed portion 322 of the 4-th cutaway portion 316 and the closed portion 329 of the (5-2)-nd cutaway portion 326.

In the embodiment, as shown in FIGS. 27, 30, and 31, a chamfering process is applied to opening edges of the (5-1)-st cutaway portions 325 and the (5-2)-nd cutaway portions 326. Namely, chamfered portions 333 are formed in the opening edges of the (5-1)-st cutaway portions 325 which are located in the one circumferential end surface 313 of the one circumferential end portion 311, and chamfered portions 334 are formed in the opening edges of the (5-2)-nd cutaway portions 326 which are located in the other circumferential end surface 314 of the other circumferential end portion 312.

According to the configuration, in the case where the antistatic cover 301 is attached to or detached from the tube 302, damage due to contact between the one circumferential end portion 311 and other circumferential end portion 312 of the cover body 310, and the tube 302 is caused to hardly occur in the tube 302.

Figure 37:
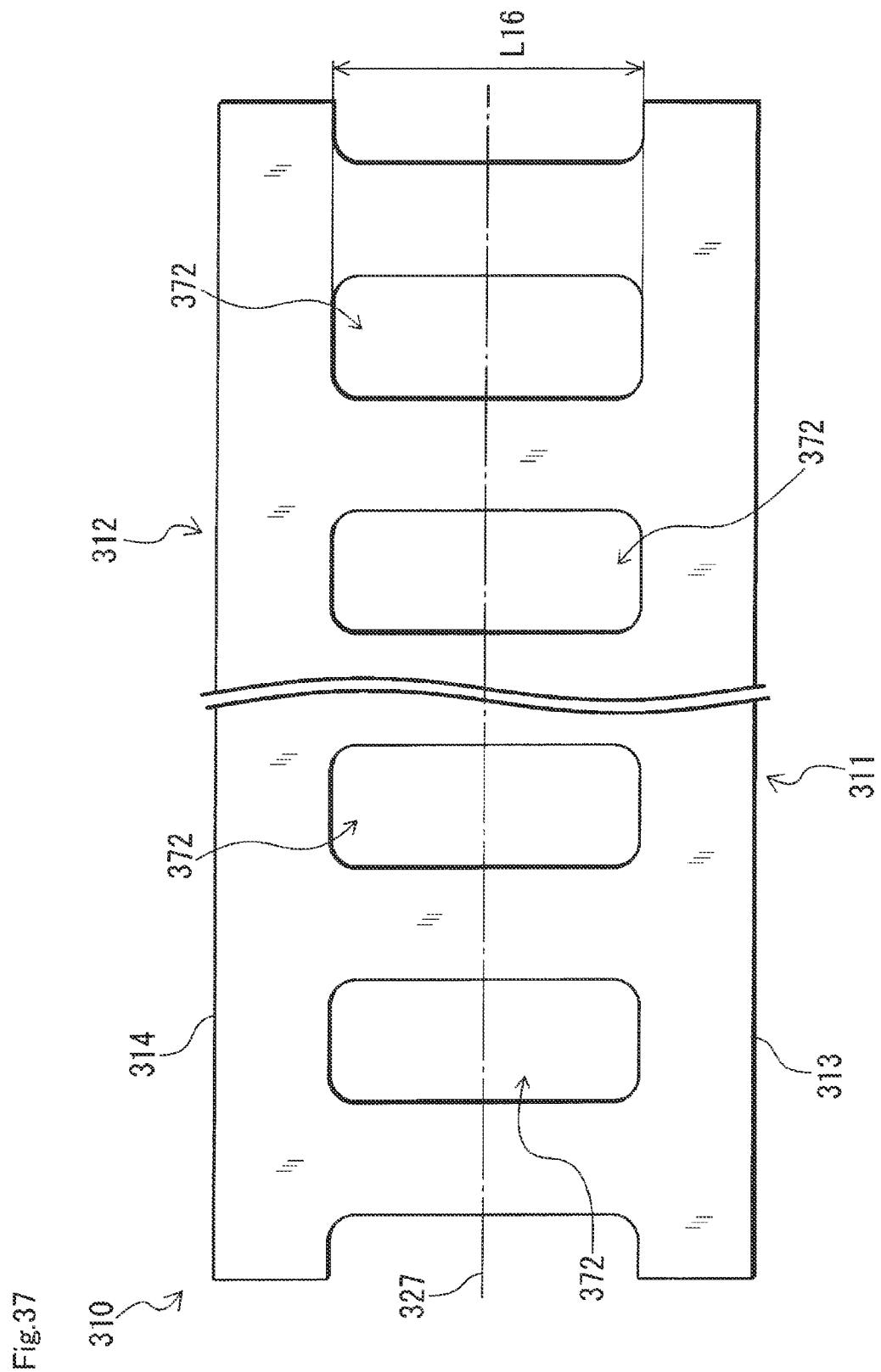
FIG. 37 is a development view of an antistatic cover of a still further embodiment of the invention.
Figure 38:
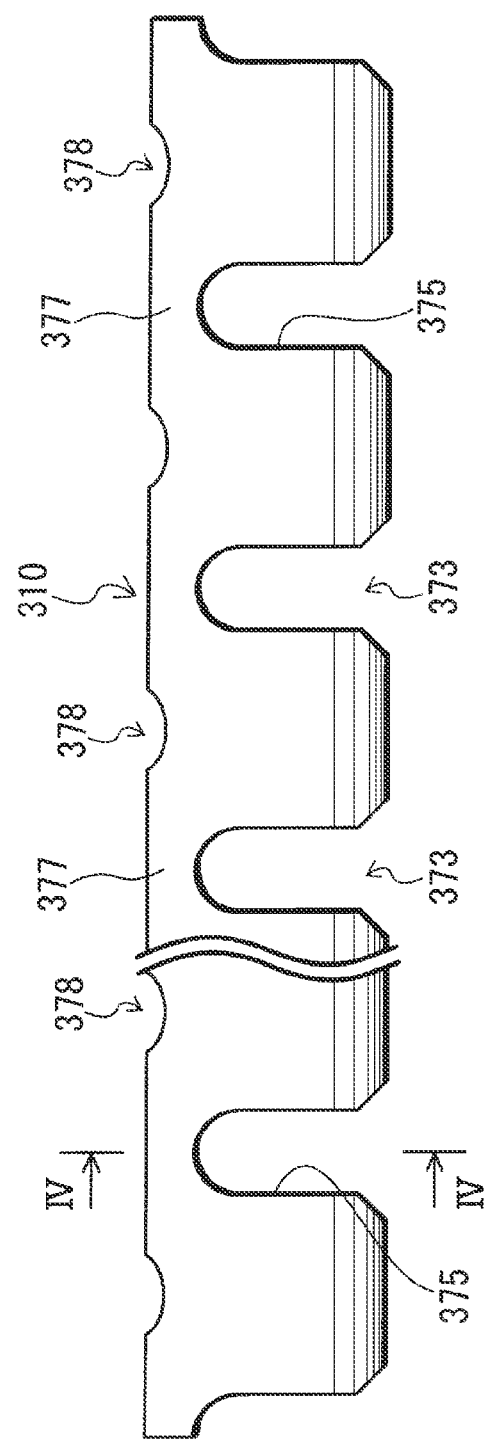
FIG. 38 is a front view of an antistatic cover of a still further embodiment of the invention.
Figure 39:
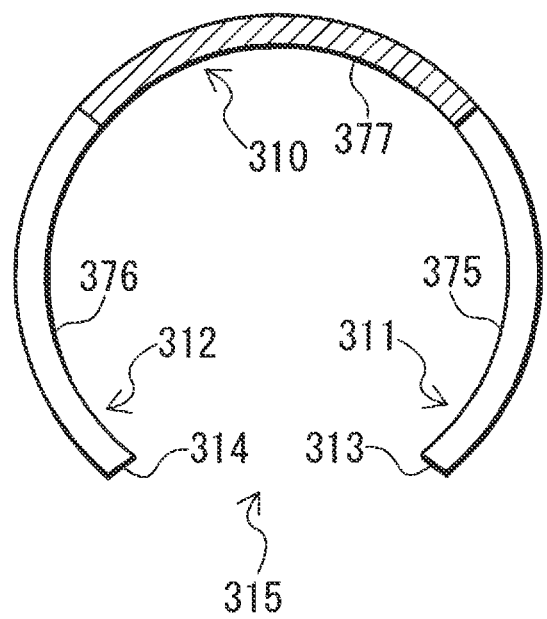
FIG. 39 is a sectional view taken along line IV-IV in FIG. 38.

Although, in the third embodiment, the 4-th cutaway portions in the invention are configured by the 4-th cutaway portions 316, the 4-th cutaway portions are not limited to this. For example, the 4-th cutaway portions may be ninth cutaway portions 371 (hereinafter, "ninth cutaway portion" is referred to as "9-th cutaway portion") shown in FIG. 36, tenth cutaway portions 372 (hereinafter, "tenth cutaway portion" is referred to as "10-th cutaway portion") shown in FIG. 37, or eleventh cutaway portions 373 (hereinafter, "eleventh cutaway portion" is referred to as "11-th cutaway portion") which are configured by a plurality of cutaway portions placed on a substantially same circumference as shown in FIGS. 38 and 39. In the figures, components which are substantially identical with those of the third embodiment are denoted by the same reference numerals.

Figure 36:
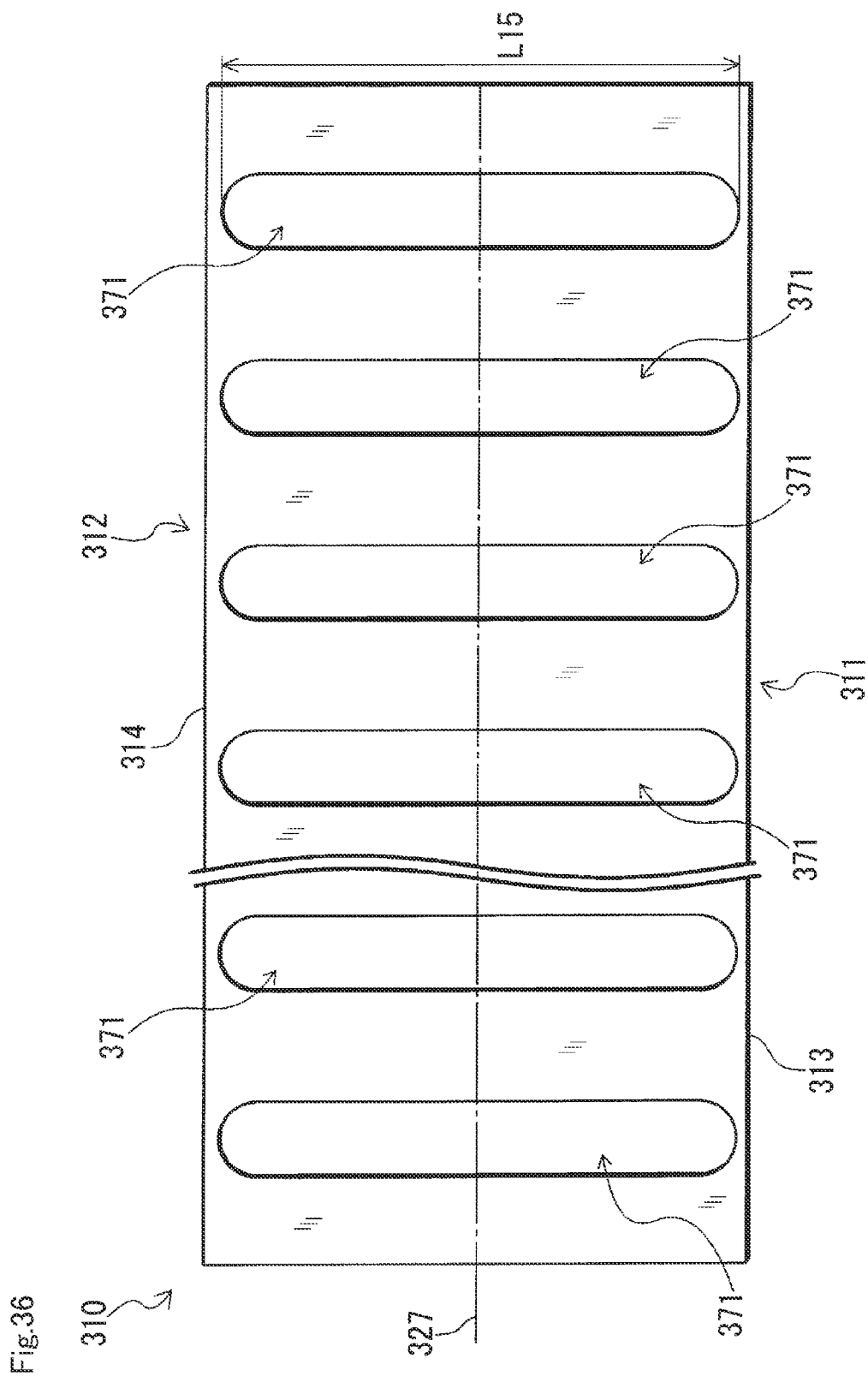
FIG. 36 is a development view of an antistatic cover of a still further embodiment of the invention.

As shown in FIG. 36, the 4-th cutaway portion in the invention may be the long-hole-like 9-th cutaway portions 371 having a length L15 which is larger than the length L12 in the above-described embodiment, with respect to the length L11 of one circumference of the cover body 310, in the circumferential direction of the cover body 310. As shown in FIG. 37, alternatively, the 4-th cutaway portion in the invention may be the rectangular 10-th cutaway portions 372 that have a length L16 which is 40% or more of the length L11 of one circumference of the cover body 310, in the circumferential direction of the cover body 310, and in which the longitudinal direction coincides with the circumferential direction of the cover body 310, and each corner is rounded.

Figure 40:
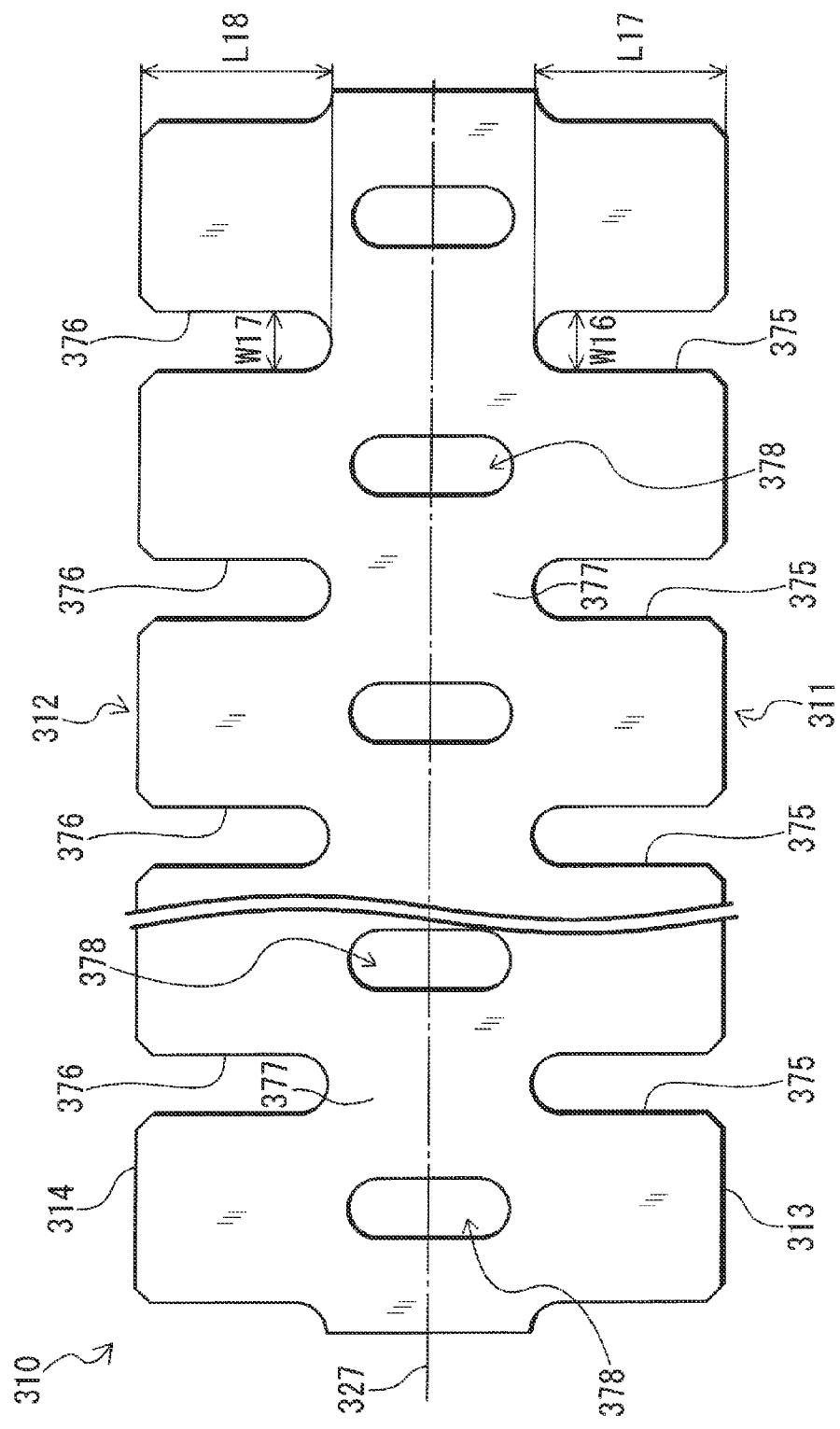
FIG. 40 is a development view of the antistatic cover of FIG. 38.

As shown in FIGS. 38 to 40, alternatively, the 4-th cutaway portion in the invention may be the 11-th cutaway portions 373 which are configured by (11-1)-st cutaway portions 375 disposed in the one circumferential end portion 311, and (11-2)-nd cutaway portions 376 disposed in the other circumferential end portion 312. In this case, the (11-1)-st cutaway portions 375 and the (11-2)-nd cutaway portions 376 are placed on a substantially same straight line in the circumferential direction of the cover body 310. The (11-1)-st cutaway portions 375 have an axial width W16, and the (11-2)-nd cutaway portions 376 have an axial width W17 which is approximately equal to the axial width W16.

In the circumferential direction of the cover body 310, the length of the 11-th cutaway portions 373, i.e., the length (L17+L18) which is the sum of the length L17 of the (11-1)-st cutaway portions 375 and the length L18 of the (11-2)-nd cutaway portions 376 is set to be 40% or more of the length L11 of one circumference of the cover body 310. Small-width portions 377 of the 11-th cutaway portions 373 have a size by which, even when the cover body 310 is bent in the axial direction, the coupling between regions that are in the cover body 310, and that are respectively on the both axial sides across the 11-th cutaway portions 373 in the cover body 310 is maintained.

In this case, as shown in FIGS. 38 and 40, at least one other cutaway portion 378 which is configured by a through hole passing through the cover body 310 may be disposed as a cutaway portion (corresponding to the other 5-th cutaway portion) other than the 11-th cutaway portions 373 (above-described (11-1)-st cutaway portions 375 and (11-2)-nd cutaway portions 376). According to the configuration, in the case where the cover body 310 surrounds a tube, when the tube is transparent or translucent, the state of the inside of the tube 302 can be visually checked through the 11-th cutaway portions 373 and the other cutaway portion 378.

In the above-described embodiments, the content rate of the conductive material in the resin composition forming the cover body 310 is set to fall preferably from 1% to 20%, more preferably from 5% to 20%, and further preferably from 5% to 15% from the viewpoints of the electrical charge preventing performance which is obtained when the cover body 310 covers the tube 302, and the attachability/detachability of the cover body 310 to and from the tube 302, repeatability of attachment and detachment, and fittability.

DESCRIPTION OF REFERENCE NUMERALS 1 antistatic cover
2 tube
10 cover body
11 1-st divided portion
12 2-nd divided portion
17 (1-1)-st cutaway portion
18 (1-2)-nd cutaway portion
20 thick tube
21 through hole
27 closed portion of 1-st cutaway
28 closed portion of 2-nd cutaway
33 opening edge of 1-st cutaway
105 indication
110 antistatic cover
116 cover body
117 indication
201 antistatic cover
202 tube
210 cover body
211 1-st divided portion
212 2-nd divided portion
215 gap
216 2-nd cutaway portion
221 closed portion on one end side in circumferential direction of 2-nd cutaway portion
222 closed portion on other end side in circumferential direction of 2-nd cutaway portion
225 (3-1)-st cutaway portion
226 (3-2)-nd cutaway portion
253 (3-3)-rd cutaway portion
254 (3-4)-th cutaway portion
255 (3-5)-th cutaway portion
256 (3-6)-th cutaway portion
257 (3-7)-th cutaway portion
258 (3-8)-th cutaway portion
271 6-th cutaway portion
272 7-th cutaway portion
273 8-th cutaway portion
278 other cutaway portion
301 antistatic cover
302 tube
310 cover body
311 one circumferential end portion
312 other circumferential end portion
315 gap
316 4-th cutaway portion
321 closed portion on one end side in circumferential direction of cutaway portion
322 closed portion on other end side in circumferential direction of cutaway portion
325 (5-1)-st cutaway portion
326 (5-2)-nd cutaway portion
353 (5-3)-rd cutaway portion
354 (5-4)-th cutaway portion
355 (5-5)-th cutaway portion
356 (5-6)-th cutaway portion
357 (5-7)-th cutaway portion
358 (5-8)-th cutaway portion
371 9-th cutaway portion
372 10-th cutaway portion
373 11-th cutaway portion
378 other cutaway portion

The invention claimed is:

1. An antistatic cover which is to cover a transparent or translucent insulating resin-made tube, wherein
the cover incudes a tubular cover body which is made of a resin composition containing a conductive material, and which can be fitted onto the tube,
the cover body is divided in one place in a circumferential direction to form 1-st and 2-nd divided portions, and elastically deformable in a manner that the 1-st and 2-nd divided portions approach or separate from each other,
the cover body is configured so as to be elastically deformed in a manner that the 1-st and 2-nd divided portions separate from each other, and allow the tube to pass through between the 1-st and 2-nd divided portions,
the cover body has a plurality of 1-st cutaway portions which pass through at least one of the 1-st and 2-nd divided portions in a radial direction of the cover body, and is configured in a manner that, when the cover body is fitted onto the tube, a part of the tube can be exposed through the plurality of 1-st cutaway portions, and
an indication relating to a fluid flowing through the tube is disposed at a position in the cover body, the position being visible from an outside.

2. The antistatic cover according to claim 1, wherein the cover body has a plurality of through holes which pass through the cover body in a radial direction of the cover body, and is configured in a manner that, when the cover body is fitted onto the tube, a part of the tube can be exposed through the plurality of through holes.

3. The antistatic cover according to claim 1, wherein the cover body is formed into a tubular shape in a state where the 1-st and 2-nd divided portions overlap each other.

4. The antistatic cover according to claim 1, wherein, in at least one of the plurality of 1-st cutaway portions, a rounding process is applied to a closed portion.

5. The antistatic cover according to claim 1, wherein, in each of the plurality of 1-st cutaway portions, a chamfering process is applied to an opening edge.

6. An antistatic cover which is to cover an insulating resin-made tube, wherein
the cover incudes a tubular cover body which is made of a resin composition containing a conductive material, and which can surround a whole circumference of the tube,
the cover body is divided in one place in a circumferential direction to form 1-st and 2-nd divided portions, and configured to be elastically deformable in a manner that a gap through which the tube is passable is formed between the 1-st and 2-nd divided portions,
the cover body has a 2-nd cutaway portion which is disposed along the circumferential direction of the cover body,
the 2-nd cutaway portion has a length which is 40% or more of a length of one circumference of the cover body, in the circumferential direction of the cover body,
plurality of 2-nd cutaway portions are disposed in an axial direction of the cover body, and
the cover body has a 3-rd cutaway portion which is different from the 2-nd cutaway portions, in at least one of the 1-st and 2-nd divided portions and between adjacent ones of the plurality of 2-nd cutaway portions.

7. The antistatic cover according to claim 6, wherein, in the 2-nd cutaway portion, closed portions on sides of both ends in the circumferential direction are rounded.

8. The antistatic cover according to claim 6, wherein the cover body is formed into a tubular shape in a state where the 1-st and 2-nd divided portions overlap each other.

9. An antistatic cover which is to cover an insulating resin-made tube, wherein
- the cover incudes a tubular cover body which is made of a resin composition containing a conductive material, and in which a part in a circumferential direction is cut away in a manner that one and other circumferential end portions that form a gap having a predetermined size between the end portions are formed,
- the cover body has a 4-th cutaway portion which is disposed along the circumferential direction of the cover body, and configured to be elastically deformable in a manner that the cover body is fittable onto the tube while the tube passes through the gap,
- the 4-th cutaway portion has a length which is 40% or more of a length of one circumference of the cover body, in the circumferential direction of the cover body,
- a plurality of 4-th cutaway portions are disposed in an axial direction of the cover body, and
- the cover body has a 5-th cutaway portion which is different from the 4-th cutaway portions, in at least one of the one and other circumferential end portions and between adjacent ones of the plurality of 4-th cutaway portions.

10. The antistatic cover according to claim 9, wherein, in the 4-th cutaway portion, closed portions on sides of both ends in the circumferential direction are rounded.

\* \* \* \* \*